US008744504B2

(12) United States Patent  
Faccin et al.

(10) Patent No.: US 8,744,504 B2  
(45) Date of Patent: Jun. 3, 2014

(54) DISTRIBUTED ANTENNA SYSTEM FOR MIMO COMMUNICATIONS

(75) Inventors: Pier Faccin, Savignanon (IT); Luigi Tarlazzi, Bagnavacallo (IT)

(73) Assignee: Andrew LLC, Hickory, NC (US)

( * ) Notice: Subject to any disclaimer, the term of this patent is extended or adjusted under 35 U.S.C. 154(b) by 496 days.

(21) Appl. No.: 13/025,697

(22) Filed: Feb. 11, 2011

(65) Prior Publication Data

US 2011/0201368 A1 Aug. 18, 2011

Related U.S. Application Data

(63) Continuation of application No. PCT/US2011/023991, filed on Feb. 8, 2011.

(30) Foreign Application Priority Data

Feb. 12, 2010 (IT) .............................. BO2010A0077

(51) Int. Cl.
*H04B 7/24* (2006.01)
*H04B 7/04* (2006.01)
*H04B 7/02* (2006.01)

(52) U.S. Cl.
CPC .............. *H04B 7/0413* (2013.01); *H04B 7/022* (2013.01); *H04B 7/026* (2013.01); *H04B 7/0426* (2013.01); *H04B 7/0452* (2013.01)
USPC .......... 455/507; 455/41.2; 455/522; 375/299; 398/79

(58) Field of Classification Search
CPC ..... H04B 7/0413; H04B 7/0691; H04B 7/026
USPC ............ 455/507, 41.2, 522, 69, 67.11, 67.16, 455/552.1, 561, 115.1, 135, 124, 121, 334, 455/456.1; 375/224, 220, 222, 226, 227, 375/141, 299, 295, 376; 370/445; 398/79, 398/165, 139, 115, 118, 182
See application file for complete search history.

(56) References Cited

U.S. PATENT DOCUMENTS

| 3,665,316 A | 5/1972 | Jeffers |
| 3,778,716 A | 12/1973 | Stokes |

(Continued)

FOREIGN PATENT DOCUMENTS

| WO | WO9955012 | 4/1999 |
| WO | WO0110156 | 2/2001 |

(Continued)

OTHER PUBLICATIONS

Four-Page BongYoul Cho, et al., "Practical Scheme to Enable MIMO Communications in Distributed Antenna Systems for Efficient Indoor Coverage" Symposium on Communications and Information Technology, IEEE, Piscataway, NJ, USA, Sep. 28, 2009 pp. 25-28.

(Continued)

*Primary Examiner* — Tan Trinh
(74) *Attorney, Agent, or Firm* — Wood, Herron & Evans, LLP

(57) ABSTRACT

A method of deploying a distributed antenna system (DAS) is provided. The method comprises outputting first and second signals from a multiple-input and multiple-output base station (MIMO BTS) and coupling a master unit to the MIMO BTS. The method further comprises coupling first and second remote units to the master unit, the first remote unit communicating the first signal over a first air interface located within the environment at a first location, the second remote unit communicating the second signal over a second air interface within the environment at a second location. The first and second remote units are arranged at the first and second locations within the environment and configured to provide signal coverage of both the first signal and the second signal at a third location in the environment to provide the capacity for MIMO communications through the system at the third location.

17 Claims, 16 Drawing Sheets

(56) References Cited

U.S. PATENT DOCUMENTS

| | | |
|---|---|---|
| 3,898,566 A | 8/1975 | Switzer et al. |
| 4,092,596 A | 5/1978 | Dickinson et al. |
| 4,238,779 A | 12/1980 | Dickinson et al. |
| 4,615,040 A | 9/1986 | Mojoli |
| 4,709,418 A | 11/1987 | Fox et al. |
| 4,763,317 A | 8/1988 | Lehman et al. |
| 4,849,811 A | 7/1989 | Kleinerman |
| 5,153,763 A | 10/1992 | Pidgeon |
| 5,519,735 A | 5/1996 | Rice et al. |
| 5,627,879 A | 5/1997 | Russell et al. |
| 5,657,374 A | 8/1997 | Russell et al. |
| 5,715,275 A | 2/1998 | Emi |
| 5,719,867 A | 2/1998 | Borazjani |
| 5,881,095 A | 3/1999 | Cadd |
| 5,930,231 A | 7/1999 | Miller et al. |
| 6,064,665 A | 5/2000 | Leuck et al. |
| 6,215,777 B1 | 4/2001 | Chen et al. |
| 6,418,558 B1 | 7/2002 | Roberts et al. |
| 6,590,871 B1 | 7/2003 | Adachi |
| 6,715,349 B2 | 4/2004 | Atkinson |
| 6,870,515 B2 | 3/2005 | Kitchener et al. |
| 7,233,771 B2 | 6/2007 | Proctor, Jr. et al. |
| 7,260,153 B2 | 8/2007 | Nissani |
| 7,328,033 B2 | 2/2008 | Rappaport et al. |
| 7,339,897 B2 | 3/2008 | Larsson et al. |
| 7,346,040 B2 | 3/2008 | Weinstein |
| 7,391,815 B2 | 6/2008 | Lakkis |
| 7,395,040 B2 | 7/2008 | Behzad |
| 7,403,576 B2 | 7/2008 | Lakkis |
| 7,430,397 B2 | 9/2008 | Suda et al. |
| 7,440,436 B2 | 10/2008 | Cheng et al. |
| 7,443,708 B2 | 10/2008 | Madan et al. |
| RE40,564 E | 11/2008 | Fischer et al. |
| 7,450,637 B2 | 11/2008 | Lakkis |
| 7,483,483 B2 | 1/2009 | Lakkis |
| 7,483,504 B2 | 1/2009 | Shapira et al. |
| 7,555,261 B2 | 6/2009 | O'Neill |
| 7,603,141 B2 | 10/2009 | Dravida |
| 7,613,423 B2 | 11/2009 | Ngo et al. |
| 7,653,083 B2 | 1/2010 | Liu et al. |
| 7,656,842 B2 | 2/2010 | Thomas et al. |
| 7,672,739 B2 | 3/2010 | Ganesan et al. |
| 7,710,327 B2 | 5/2010 | Saban et al. |
| 7,720,036 B2 | 5/2010 | Sadri et al. |
| 7,751,775 B2 | 7/2010 | Baier et al. |
| 7,760,699 B1 | 7/2010 | Malik |
| 7,761,050 B2 | 7/2010 | Fitton et al. |
| 7,787,823 B2 | 8/2010 | George et al. |
| 7,809,073 B2 | 10/2010 | Liu |
| 7,817,603 B2 | 10/2010 | Liu |
| 7,822,148 B2 | 10/2010 | Shapira et al. |
| 7,840,190 B2 | 11/2010 | Saban et al. |
| 8,396,368 B2 * | 3/2013 | Tarlazzi et al. ............... 398/115 |
| 2003/0002604 A1 | 1/2003 | Fifield |
| 2004/0106435 A1 | 6/2004 | Bauman |
| 2006/0063494 A1 | 3/2006 | Zhang |
| 2007/0093273 A1 | 4/2007 | Cai |
| 2007/0104165 A1 | 5/2007 | Hanoka |
| 2007/0201536 A1 | 8/2007 | Nicolas |
| 2007/0274279 A1 | 11/2007 | Wood |
| 2008/0056332 A1 | 3/2008 | Lakkis |
| 2008/0056333 A1 | 3/2008 | Lakkia |
| 2008/0095259 A1 | 4/2008 | Dyer |
| 2008/0107202 A1 | 5/2008 | Lee |
| 2008/0112499 A1 | 5/2008 | Bennett |
| 2008/0150514 A1 | 6/2008 | Codreanu |
| 2008/0174502 A1 | 7/2008 | Oren |
| 2008/0175175 A1 | 7/2008 | Oren |
| 2008/0191941 A1 | 8/2008 | Saban |
| 2008/0198955 A1 | 8/2008 | Oren |
| 2008/0200117 A1 | 8/2008 | Oren |
| 2008/0232305 A1 | 9/2008 | Oren |
| 2008/0284647 A1 | 11/2008 | Oren |
| 2009/0005096 A1 | 1/2009 | Scheinert |
| 2009/0061939 A1 | 3/2009 | Andersson |
| 2009/0124214 A1 | 5/2009 | Zhang |
| 2009/0135944 A1 | 5/2009 | Dyer |
| 2009/0141691 A1 | 6/2009 | Jain |
| 2009/0180426 A1 | 7/2009 | Sabat |
| 2009/0219976 A1 | 9/2009 | Oren |
| 2009/0279442 A1 | 11/2009 | Rave |
| 2009/0316608 A1 | 12/2009 | Singh |
| 2009/0316609 A1 | 12/2009 | Singh |
| 2010/0027940 A1 | 2/2010 | Shapiro |
| 2010/0029320 A1 | 2/2010 | Malladi |
| 2010/0093391 A1 | 4/2010 | Saban |
| 2010/0099451 A1 | 4/2010 | Saban |
| 2011/0135308 A1 * | 6/2011 | Tarlazzi et al. ............... 398/79 |
| 2011/0243291 A1 * | 10/2011 | McAllister et al. ........... 375/376 |
| 2013/0188753 A1 * | 7/2013 | Tarlazzi et al. ............... 375/299 |

FOREIGN PATENT DOCUMENTS

| | | |
|---|---|---|
| WO | WO0225506 | 3/2002 |
| WO | WO2005048401 | 5/2005 |
| WO | WO2007054945 | 5/2007 |
| WO | WO2007133630 | 11/2007 |
| WO | WO2008004955 | 1/2008 |
| WO | WO2008027531 | 3/2008 |
| WO | WO2008103374 | 4/2008 |
| WO | WO2008103375 | 4/2008 |
| WO | WO2008076432 | 6/2008 |
| WO | WO2008088862 | 7/2008 |
| WO | WO2008888859 | 7/2008 |
| WO | WO2008097651 | 8/2008 |
| WO | WO2008099383 | 8/2008 |
| WO | WO2008099390 | 8/2008 |
| WO | WO2009002938 | 12/2008 |
| WO | WO2009053910 | 4/2009 |
| WO | WO2009081376 | 7/2009 |
| WO | WO2009138876 | 11/2009 |
| WO | WO2009155602 | 12/2009 |
| WO | WO2010013142 | 4/2010 |

OTHER PUBLICATIONS

Four-Page Annex to Communication Relating to the Results of the Partial International Search mailed Mar. 15, 2011 (PCT/US2011/023991).

Nineteen Page International Search Report and Written Opinion mailed Apr. 14, 2011 (PCT/US2011/023991).

* cited by examiner

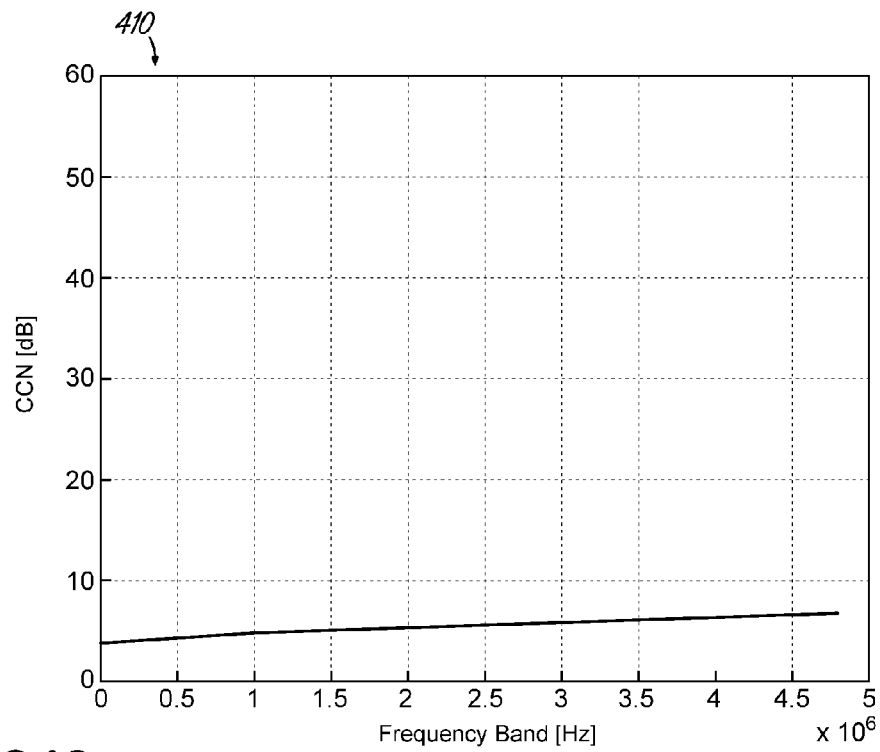
FIG.10  <5 dB Imbalance
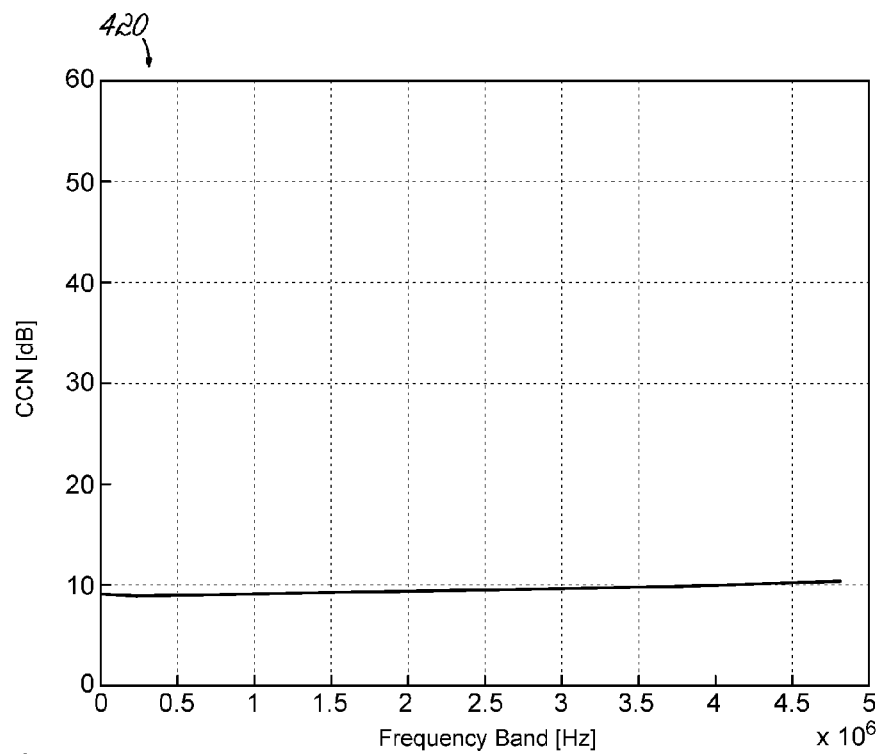
FIG.11  Between 5 and 10 dB Imbalance

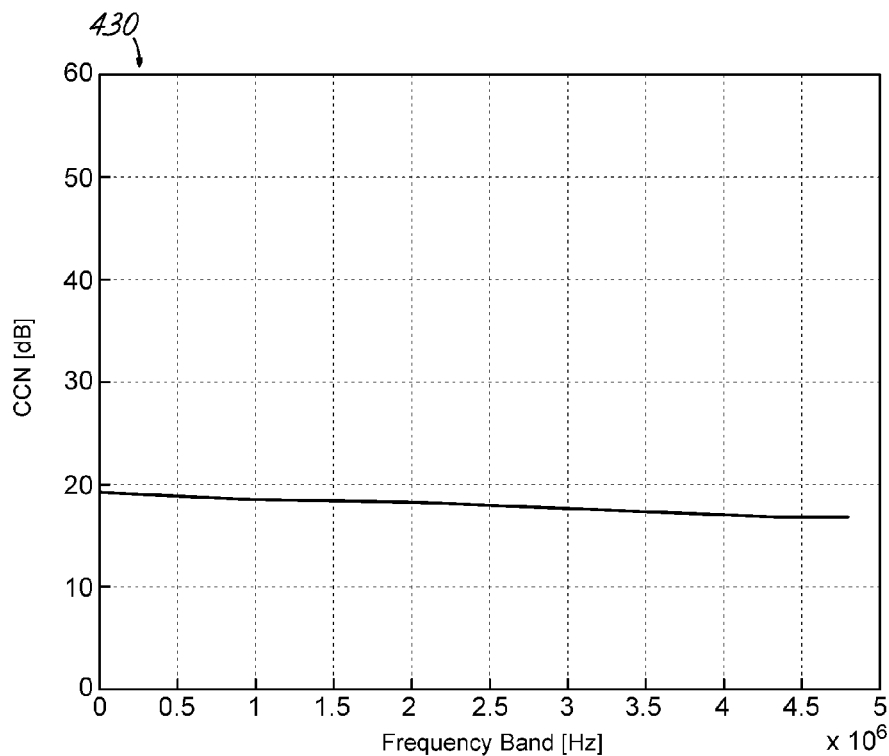
FIG.12 between 10 and 15 dB Imbalance
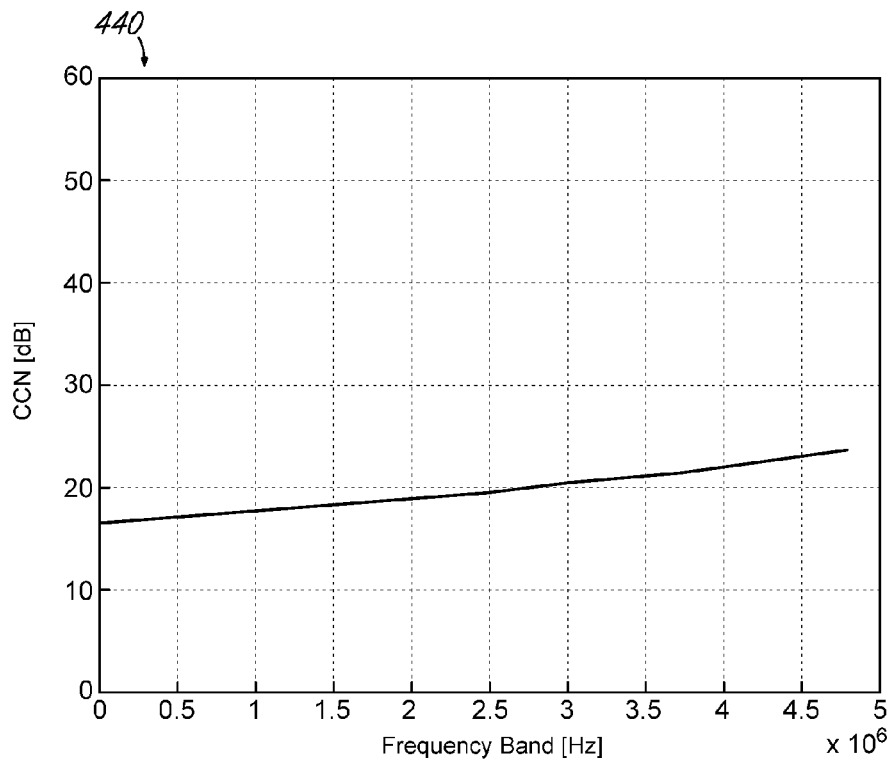
FIG.13 > 15 dB Imbalance

DISTRIBUTED ANTENNA SYSTEM FOR MIMO COMMUNICATIONS

RELATED APPLICATIONS

This Application claims priority to Italian Application No. BO2010A000077 filed Feb. 12, 2010, entitled "DISTRIBUTED ANTENNA SYSTEM FOR MIMO COMMUNICATIONS" and is a continuation Application of U.S. PCT Application No. PCT/US2011/023991, filed Feb. 8, 2011, entitled "DISTRIBUTED ANTENNA SYSTEM FOR MIMO COMMUNICATIONS", which applications are both incorporated herein by reference in their entireties.

FIELD OF THE INVENTION

Embodiments of the invention are directed to wireless communication systems, and specifically directed to a distributed antenna system for wireless MIMO communications.

BACKGROUND OF THE INVENTION

A contemporary wireless communication system, such as distributed antenna system, includes a plurality of remote units distributed throughout a service area (e.g., a building) to provide coverage within the service area of the system. In particular, each remote antenna unit is typically coupled to a master unit, which, in turn, is coupled to at least one single-input-and single-output ("SISO") base transceiver station ("BTS," or more simply, "base station").

Each remote unit generally transceives wireless signals with a number of wireless devices, such as a telephone devices or computing devices in the proximity of the remote unit. In particular, the wireless signals from each remote unit are associated with one or more BTSs. Thus, the wireless devices may communicate with the system BTS's through any of the wireless signals from the remote units.

To improve such wireless communications, Multiple-Input/Multiple-Output ("MIMO") technology might be utilized to provide advanced solutions for performance enhancement and capacity in broadband wireless communication systems. It has been shown that substantial improvements may be realized utilizing a MIMO technique with respect to the traditional SISO systems. MIMO systems have capabilities that allow them to fully exploit the multi-path richness of a wireless channel. This is in contrast with traditional techniques that try to counteract multi-path effects rather than embrace them. MIMO systems generally rely upon multi-element antennas at both of the ends of the communication links, such as at the base station and also in the mobile device. In addition to desirable beam-forming and diversity characteristics, MIMO systems also may provide multiplexing gain, which allows multi data streams to be transmitted over spatially-independent parallel sub-channels. This may lead to a significant increase either in the system capacity or in the data throughput to each wireless device. Generally, distributed antenna systems cannot take advantage of MIMO technology because they are just designed to provide SISO wireless coverage.

For example, in traditional distributed systems, a wireless device communicates with only one of the remote units, the signals of which are typically isolated from signals of other remote units using base station sectorization techniques. In this manner, the signals from different remote units avoid interference due to overlap of coverage areas. The wireless signals from each remote unit are typically at the same frequency and carry the same data.

Additional problems occur with a distributed antenna system disposed within an indoor environment. For example, indoor environments are often associated with increased amounts of multipath richness. Generally, internal building components (e.g., columns, pipes, walls, doors) as well as objects inside that building (e.g., computers, desks, fixtures) cause an increasing of the scattering phenomena. Also for example, SISO distributed antenna systems are typically designed to provide wireless coverage within a particular indoor environment. However, because of the multipath richness, antenna shadowing can occur depending upon the particular layout, user position, and obstacles within that indoor environment.

Accordingly, it is desirable to improve upon existing distributed antenna systems taking advantage of MIMO technology in distributed wireless environments which may benefit such propagation conditions.

SUMMARY OF THE INVENTION

Embodiments of the invention provide a method of deploying a distributed antenna system. The method comprises outputting at least a first signal and a second signal from a multiple-input and multiple-output (MIMO) base station and coupling first and second master units to the MIMO base station, the first and second master units configured to receive the first and second signal, respectively. The method further comprises coupling a first remote unit to the first master unit, the first remote unit communicating the first signal a first air interface located within an environment at a first location and coupling a second remote unit to the second master unit, the second remote unit communicating the second signal over a second air interface within the environment at a second location. The method then comprises analyzing at least an imbalance of received power between the first and second signals determined within the environment at a third location to determine whether a predetermined capacity for MIMO communications with the system has been achieved.

Alternative embodiments of the invention also provide a method for determining the placement of a plurality of antennas of a distributed antenna system with a computing system of the type that includes one or more processors and a memory. In those alternative embodiments, the method comprises simulating a first remote unit communicating a first signal over a first air interface located within an environment at a first location and simulating a second remote unit communicating a second signal over a second interface located within an environment at a second location. The method further comprises analyzing at least a simulated imbalance of received power between the first and second signals determined within the environment at a third location to determine whether a predetermined capacity for MIMO communications with the system has been achieved.

BRIEF DESCRIPTION OF THE DRAWINGS

FIG. 10 is a data plot illustrating the effect of an imbalance of the received power of two signals on the CCN when that imbalance is from about 5 dB to about 10 dB.

FIG. 11 is a data plot illustrating the effect of an imbalance of the received power of two signals on the CCN when that imbalance is from about 5 dB to about 10 dB.

FIG. 12 is a data plot illustrating the effect of an imbalance of the received power of two signals on the CCN when that imbalance is from about 10 dB to about 15 dB.

FIG. 13 is a data plot illustrating the effect of an imbalance of the received power of two signals on the CCN when that imbalance is greater than about 15 dB.

It should be understood that the appended drawings are not necessarily to scale, presenting a somewhat simplified representation of various preferred features illustrative of the basic principles of embodiments of the invention. The specific design features of the system and/or sequence of operations as disclosed herein, including, for example, specific dimensions, orientations, locations, and shapes of various illustrated components, will be determined in part by the particular intended application and use environment. Certain features of the illustrated embodiments may have been enlarged, distorted or otherwise rendered differently relative to others to facilitate visualization and clear understanding.

DETAILED DESCRIPTION OF THE INVENTION

Figure 1:
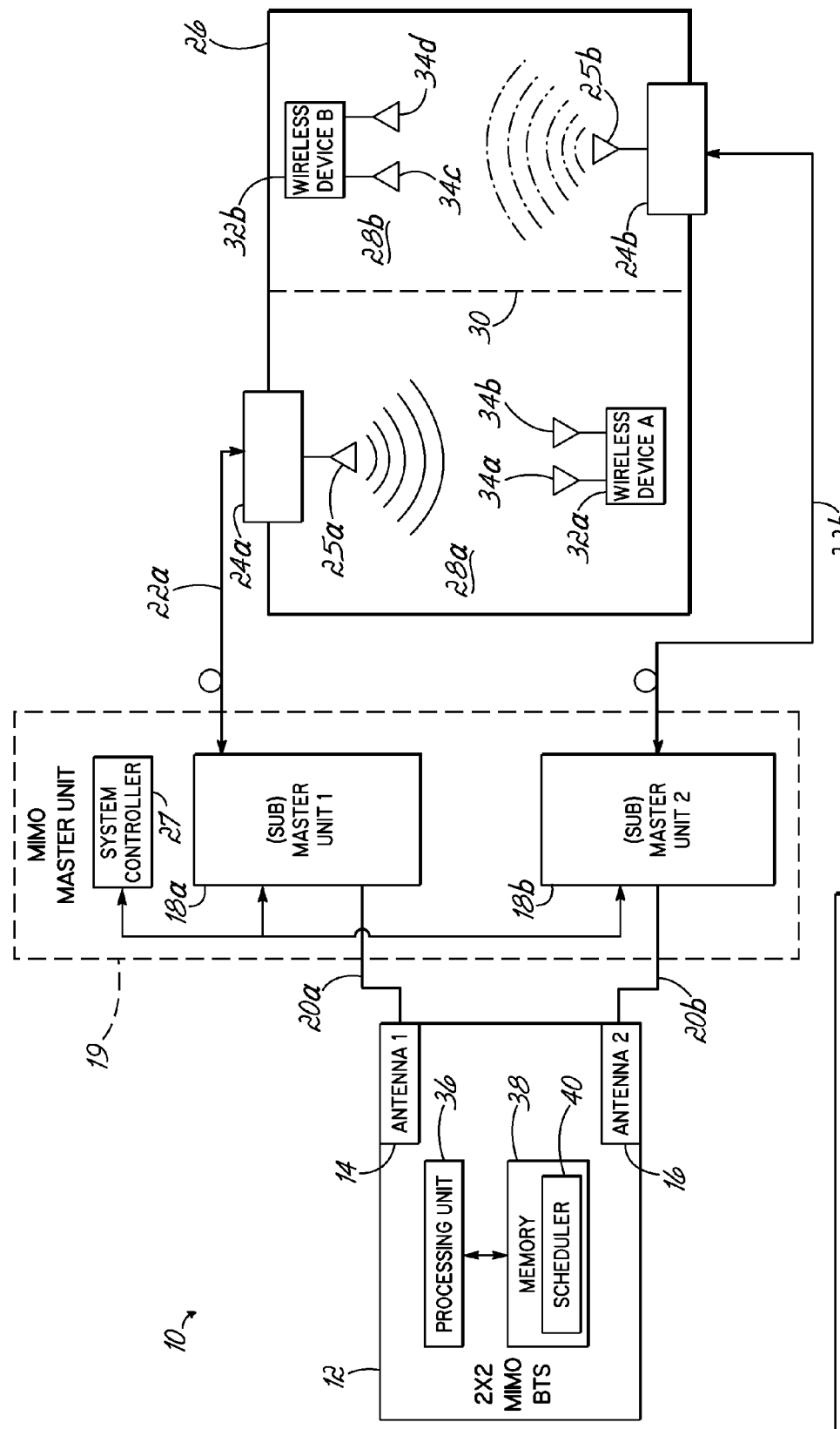
FIG. 1 is a block diagram of a distributed antenna system consistent with embodiments of the invention.

Turning to the drawings, wherein like numbers denote like parts throughout the several views, FIG. 1 illustrates a schematic view of one possible implementation of a Multiple-Input/Multiple-Output ("MIMO") distributed antenna system 10, wherein a MIMO base station ("BTS") 12 is incorporated in or proximate to an environment in accordance with the invention. As illustrated in FIG. 1, the system 10 includes a MIMO BTS 12 that might be configured with at least two antennas 14 and 16. While a 2×2 MIMO BTS is illustrated, one of skill in the art would understand that additional antennas might be used for a different MIMO scheme. The first antenna 14 is coupled to a first master unit 18a through a first signal link 20a, while the second antenna 16 is coupled to a second master unit 18b through a second signal link 20b. Alternatively, the MIMO BTS 12 might not be configured with antennas. In those embodiments, the MIMO BTS 12 includes at least two antenna ports (not shown) in place of the antennas 14 and 16. The antennas 15 and 16 may be implemented elsewhere to capture the MIMO signals from another BTS to forward to the MIMO BTS 12. A first antenna port is coupled to the first master unit 18a through the first signal link 20a, while a second antenna port is coupled to the second master unit 18b through the second signal link 20b. The signal links are any appropriate form for passing signals between the components. As illustrated in FIG. 1, the first and second master units 18a-b might be configured as first and second sub-master units 18a-b of a MIMO master unit 19.

The master units 18a-b are coupled through respective broad band transport mediums or links 22a-b to a plurality of respective remote units 24a-b. Each link 22a-b might be a high-speed digital link or a wideband analogue signal transmission link. For example, an analog transport medium/link may be used for connecting the remote units 24a-b with respective master units 18a-b. Alternatively, the transport links may be implemented as optical links using optical fiber as discussed below. With such fiber, the traffic between the remote units 24a-b and the master units 18a-b may be implemented using a radio-over-fiber ("RoF") format, for example. In this manner, the signals from the master units 18a-b are provided to the remote units 24a-b in an analog format, which may assist in preventing at least some degradation due to transmission line effects, which appears in traditional copper-based transmission lines. It will be appreciated by one having ordinary skill in the art that filtering may also be used to allow and/or prevent the distribution of specific signals. As such, and in some embodiments, each of the links 22a-b may be a wideband digitally modulated optical interface, such as fiber optic cable. Thus, each master unit 18a-b may be configured to digitize their respective input signals and output those digital signals for their respective remote units 24a-b. These digital output signals may, in some embodiments, be time division multiplexed into frames and converted into a serial stream. The remote units 24a-b, in turn, may be configured to receive the digital output signals from their respective master units 18a-b, convert the digital output signals into electrical signals, if necessary, de-frame various time slots and/or de-serialize the electrical signals, and transmit the electrical signals via respective local antennas 25a-b. The master units 18a-b and remote units 22a-b, in turn, may be controlled by a system controller 27, which may provide overall supervision and control of the master units 18a-b and remote units 22a-b, as well as alarm forwarding.

FIG. 1 illustrates that the remote units 24a-b, or at least the respective antennas 25a-b for the remote units 24a-b, are disposed within an indoor environment 26. As will be appreciated by one having ordinary skill in the art, an indoor environment 26 includes structures that can cause obstruction (partial or total) of the radio transmissions. These include walls, partitions, structural components, electrical conduits, plumbing, doors, computers, and people, for example. As such, the indoor environment 26 is illustrated for discussion purposes as including two areas 28a-b that are provided with signals by the respective remote units 24a-b and that may be at least somewhat electromagnetically isolated. For illustration purposes, the areas 28a-b are illustrated as separated by an illustrative separator 30, such as at least one partition or wall 30, though one having ordinary skill in the art will appreciate that the areas 28a-b may be at least somewhat electromagnetically isolated by way of other structures within the indoor environment 26, by the distance between the two areas 28a-b, or in some other manner as will be appreciated by one having ordinary skill in the art. Furthermore, environment 26 might include other areas in addition to 28a-b that affect the signals of other remote units of the plurality in addition to the remote unites 24a-b that are illustrated for discussion purposes.

Thus, there is an imbalance of the power of signals from the remote units 24a-b received by the wireless devices 32a-b. For example, remote units 24a-b can provide signals to wireless device 32a in its respective area 28a, but there is a power imbalance between the signals received by device 32a from the respective remote units 24a-b. Similarly, remote units 24a-b can provide signals to wireless device 32b in its respective area 28b, but there is a power imbalance between the signals received by device 32b from the respective remote units 24a-b. Each wireless device 32a-b, in turn, may be configured with at least two antennas 34a-d to communicate signals to and/or from the remote units 24a-b according to MIMO schemes. As illustrated in FIG. 1, a first wireless device 32a is configured with at least two antennas 34a-b, while a second wireless device 32b is configured with at least two antennas 34c-d.

In one embodiment, the remote units 24a-b are configured to send and/or receive digital RF voice and/or data signals to and/or from the wireless devices 32a-b via their local antennas 25a-b. The master units 18a-b convert a signal from their respective remote units 24a-b from an optical signal to an electrical signal and send the electrical signal to the antennas 14 and/or 16 of the MIMO BTS 12, which may be configured to detect and receive their respective portions thereof. Alternatively, the master units 18a-b may convert a signal from their respective remote units 24a-b from an optical signal to an analog electrical signal, separate the electrical signal into a plurality of electrical signals in a plurality of bands corresponding to those utilized by the MIMO BTS 12, convert the plurality of electrical signals into a plurality of analog signals, and send the plurality of analog signals to the MIMO BTS 12.

A master unit 18a-b may be selectively connected to respective remote units 24a-b in a number of ways. For example, master unit 18a is illustrated as connected to remote unit 24a through full-duplex link 22a (e.g., a time-division multiplexed link) for uplink and downlink to and from the remote unit 24a. Master unit 18b is connected to remote unit 24b in a similar manner. However, one having ordinary skill in the art will appreciate that the master units 18a-b may be connected through two half-duplex links to each respective remote unit 24a-b. For example, and in alternative embodiments, the master unit 18a can be connected through a first half-duplex link (not shown) to remote unit 24a for uplink to the remote unit 24a, and be connected through a second half-duplex link (not shown) to remote unit 24a for downlink from the remote unit 24a. Master unit 18b may be similarly connected to remote unit 24b. As illustrated in FIG. 1, in a full-duplex link, the uplink signals and downlink signals are carried on different wavelengths and a wavelength division multiplexer ("WDM") is employed to combine and/or split the two optical signals at the master units 18a-b and remote units 24a-b. Alternatively, the master units 18a-b and remote units 24a-b may communicate through a different analog or digital transceiver for high data rate media such as coax cable, twisted pair copper wires, free space RF or optics, or shared networks such as Ethernet, SONET, SDH, ATM and/or PDH, among others, including one that exploits WDM.

One having skill in the art will appreciate that portions of the system 10 might be coupled to a SISO BTS. Accordingly, embodiments of the invention may be used to retrofit such SISO distributed antenna systems, allowing substantial costs savings using existing SISO equipment to implement MIMO distributed antenna systems to implement MIMO modes of operation in accordance with the aspects of the invention. For example, such a system might include two SISO BTSs that can be replaced with one MIMO BTS 12 consistent with embodiments of the invention.

As discussed above, the signals provided by the respective remote units 24a-b to the mobile devices 32a-b in the environment 26 may be associated with a power imbalance or be at least somewhat electromagnetically isolated. In accordance with one aspect of the invention, in the areas where the signals from the respective remote units 24a-b are isolated, the system 10 is configured to utilize multi-user ("MU") MIMO techniques to communicate with the wireless devices 32a-b in those isolated areas. However, there may be areas within the indoor environment 26 in which the signals from the remote units 24a-b overlap to a certain degree. As such, in one embodiment, the system 10 is configured to utilize single-user ("SU") MIMO techniques to communicate with the wireless devices 32a-b in those overlapping areas. Thus, and in some embodiments, the system 10 is configured to dynamically switch between SU-MIMO modes of operation and MU-MIMO modes of operation for sending signals to the wireless devices 32a-b based upon signal quality indicators provided by those wireless devices 32a-b. Thus, 3GPP LTE MIMO features (such as TX diversity, DL SU-MIMO, as well as DL/UL MU-MIMO) may be dynamically used.

It will be appreciated that such an aspect of the invention might be somewhat in contrast to the embodiments of the invention also discussed herein that maintain a certain degree of signal coverage overlapping between remote units 12a-b as requested by downlink SU-MIMO when implemented through the system 10. Therefore, for realizing both such advantages, embodiments of the invention manage and balance the benefits of both such MIMO features.

Thus, each remote unit 24a-b provides signals to, and receives signals from, respective wireless devices 32a-b present within the respective areas 28a-b. One benefit of this arrangement as noted is that uplink collaborative MIMO (for WiMAX) and/or uplink MU-MIMO (for LTE) may be used to increase the total uplink capacity in the system 10 by reusing the time and/or frequency resources associated with the different wireless devices 32a-b. As such, each of the wireless devices 32a-b may share resources (e.g., DL/UL MU-MIMO resources) as well as be associated with a high sector capacity (e.g., again, DL/UL MU-MIMO).

The MIMO BTS 12 is configured with at least one central processing unit ("CPU") 36 coupled to a memory 38. Each CPU 36 is typically implemented in hardware using circuit logic disposed on one or more physical integrated circuit devices or chips. Each CPU 36 may be one or more microprocessors, micro-controllers, field programmable gate arrays, or ASICs, while memory 38 may include random access memory (RAM), dynamic random access memory (DRAM), static random access memory (SRAM), flash memory, and/or another digital storage medium, and also typically implemented using circuit logic disposed on one or more physical integrated circuit devices, or chips. As such, memory 38 may be considered to include memory storage physically located elsewhere in the MIMO BTS 12, e.g., any cache memory in the at least one CPU 36. Memory 38 includes a scheduler 40 that can be executed by the CPU 36 to dynamically switch the operation of the system 10 from a SU-MIMO mode of operation to a MU-MIMO mode of operation.

In communications between MIMO BTS 12 and a wireless device 32, the wireless device 32 may provide feedback to the MIMO BTS 12 about the signals to and/or from that wireless device 32. For example, and considering the LTE standard (which is not intended to limit embodiments of the invention), the uplink feedback provided by the wireless device 32 for support of downlink signals from the MIMO BTS 12 can include one or more performance metrics related to that signal, including a Rank Indicator (RI), a Pre-coding Matrix Indicator (PMI), and a Channel Quality Indicator (CQI). The RI indicates the number of layers (data streams), which can be supported by the spatial channel experienced at the wireless device 32. The PMI is then calculated conditioned on the associated RI, and the CQI is calculated conditioned on the associated RI and PMI. Typically, a high value CQI is indicative of a channel of high quality. For an RI=1, only one CQI is reported for each reporting unit in frequency because in such a condition only one layer (data stream) can be transmitted by the MIMO BTS 12. On the other hand for RI=2, two CQI are reported for the spatial multiplexing (DL SU-MIMO) as different data streams experience different spatial channels. The PMI indicates the preferred pre-coding candidate for the corresponding frequency unit and is selected from the possible pre-coding candidates of Table 1 for the case of two transmitting antennas according to the RI.

TABLE 1

Pre-Coding Codebook for Transmission on Two Antennas

| Codebook index | Number of layers $\upsilon$ | |
|---|---|---|
| | 1 | 2 |
| 0 | $\frac{1}{\sqrt{2}}\begin{bmatrix}1\\1\end{bmatrix}$ | $\frac{1}{\sqrt{2}}\begin{bmatrix}1 & 0\\0 & 1\end{bmatrix}$ |
| 1 | $\frac{1}{\sqrt{2}}\begin{bmatrix}1\\-1\end{bmatrix}$ | $\frac{1}{2}\begin{bmatrix}1 & 1\\1 & -1\end{bmatrix}$ |
| 2 | $\frac{1}{\sqrt{2}}\begin{bmatrix}1\\j\end{bmatrix}$ | $\frac{1}{2}\begin{bmatrix}1 & 1\\j & -j\end{bmatrix}$ |
| 3 | $\frac{1}{\sqrt{2}}\begin{bmatrix}1\\-j\end{bmatrix}$ | — |

The CQI might represent a measure of Signal to Interference plus Noise Ratio (SINR), but in fact it is coded in terms of the Modulation and Coding Scheme (MCS) required for a particular error rate probability, as highlighted in Table 2. As such, the CQI indicates the combination of the maximum information data size and the modulation scheme among QPSK, 16QAM, and 64QAM, which can provide block error rate not exceeding 0.1 (i.e. $10^{-1}$) assuming that the reported rank and the reported pre-coding matrix are applied in the time-frequency resource. With this definition of CQI, PMI, and RI, the user equipment or mobile device can report the maximum data size that it can receive and demodulate, taking into account its receiver ability.

TABLE 2

CQI Table

| CQI Index | Modulation | Code Rate × 1024 | Efficiency |
|---|---|---|---|
| 0 | | out of range | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

On this feedback basis, the scheduler 40 of the MIMO BTS 12 is configured to adapt the downlink transmission mode in order to accommodate the data reception of a wireless device 32. Specifically, the scheduler 40 might chose either the DL SU-MIMO or the DL MU-MIMO modes of operation for one or more wireless devices 32. For example, and as discussed above, it is likely that the scheduler's 40 selection among these two MIMO schemes mostly relies upon the RI reported by the wireless devices 32, but may instead rely upon the CQI reported by the wireless devices 32 or calculated from the RI and PMI as discussed above. Indeed the scheduler 40 may decide to boost the data rate for a single wireless device 32, in case the channel between the MIMO BTS 12 and wireless device 32 supports two spatial streams (e.g., RI=2, such that the system 10 utilizes a SU-MIMO mode of operation). On the other hand, the scheduler 40 may allocate the same time-frequency resources to two different wireless devices 32, which have reported only a single stream (e.g., RI=1, such that the system 10 utilizes a MU-MIMO mode of operation) channel each, in order to improve the overall sector capacity. This is because when a wireless device 32 is configured to be in the MU-MIMO transmission mode, only rank-1 transmission can be scheduled to the wireless device 32.

Figure 2:
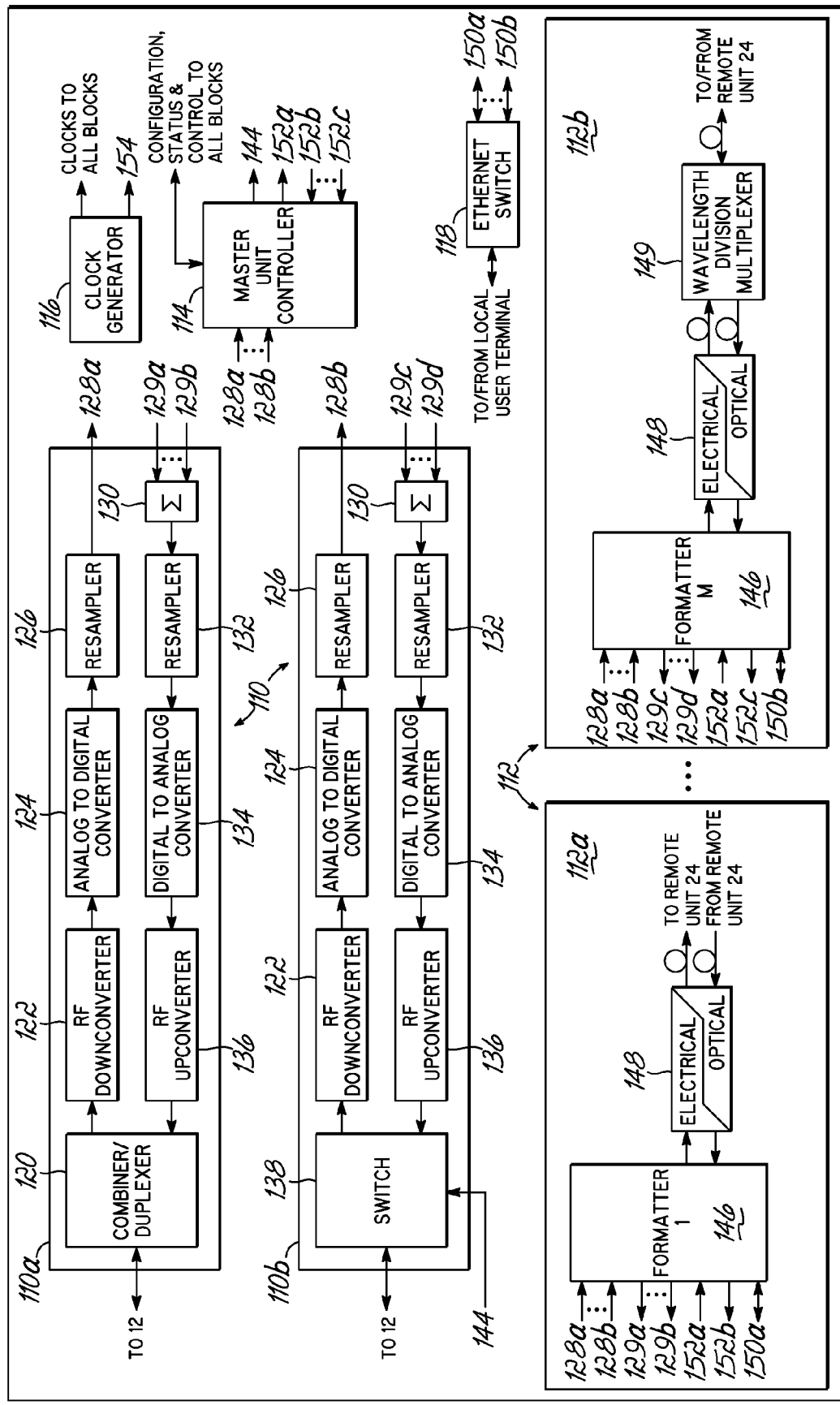
FIG. 2 is a detailed block diagram of a master unit utilized in embodiments of the invention.
Figure 3A:
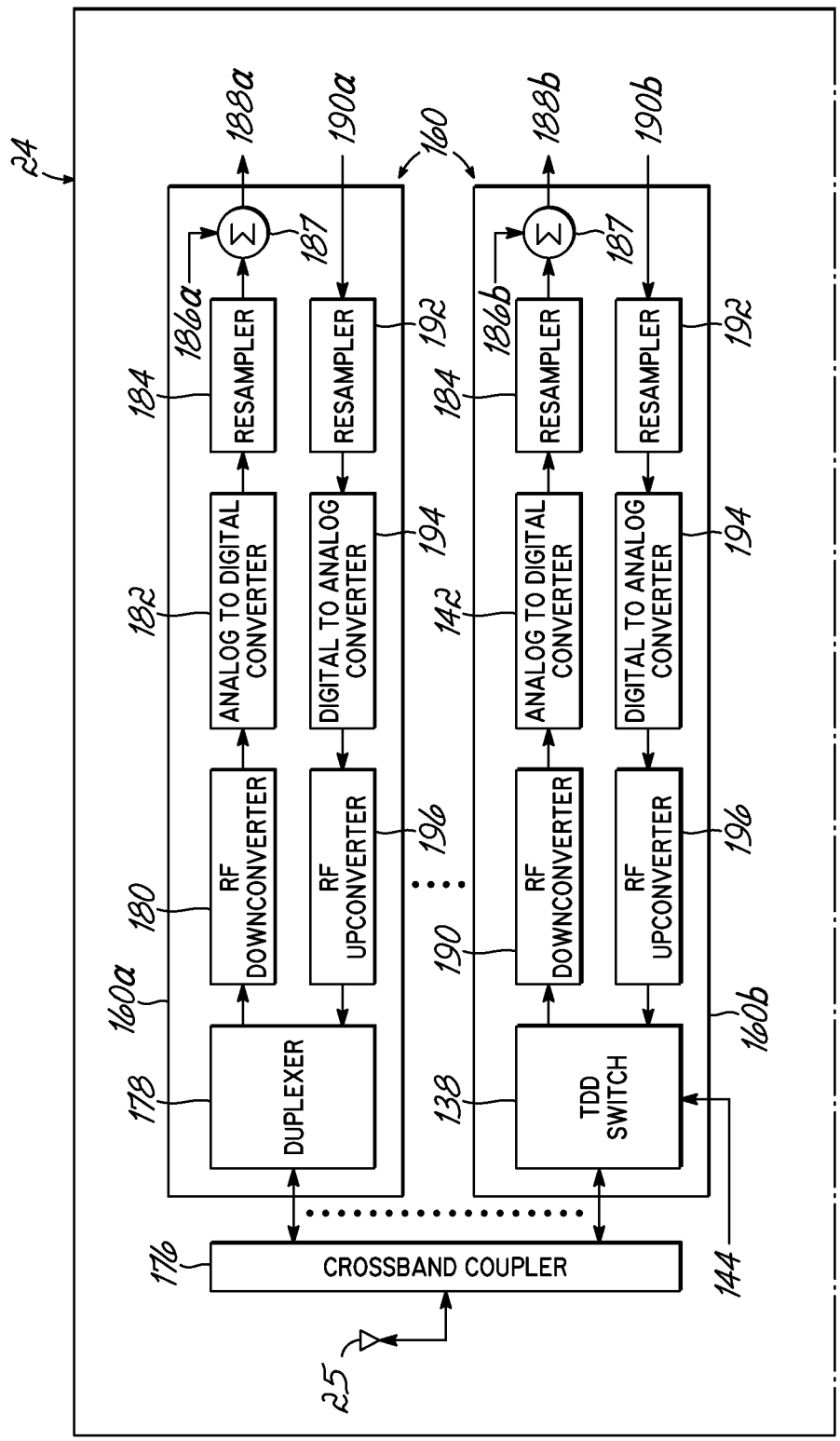
FIGS. 3A and 3B are a detailed block diagram of a portion of a remote unit utilized in embodiments of the invention.
Figure 3B:
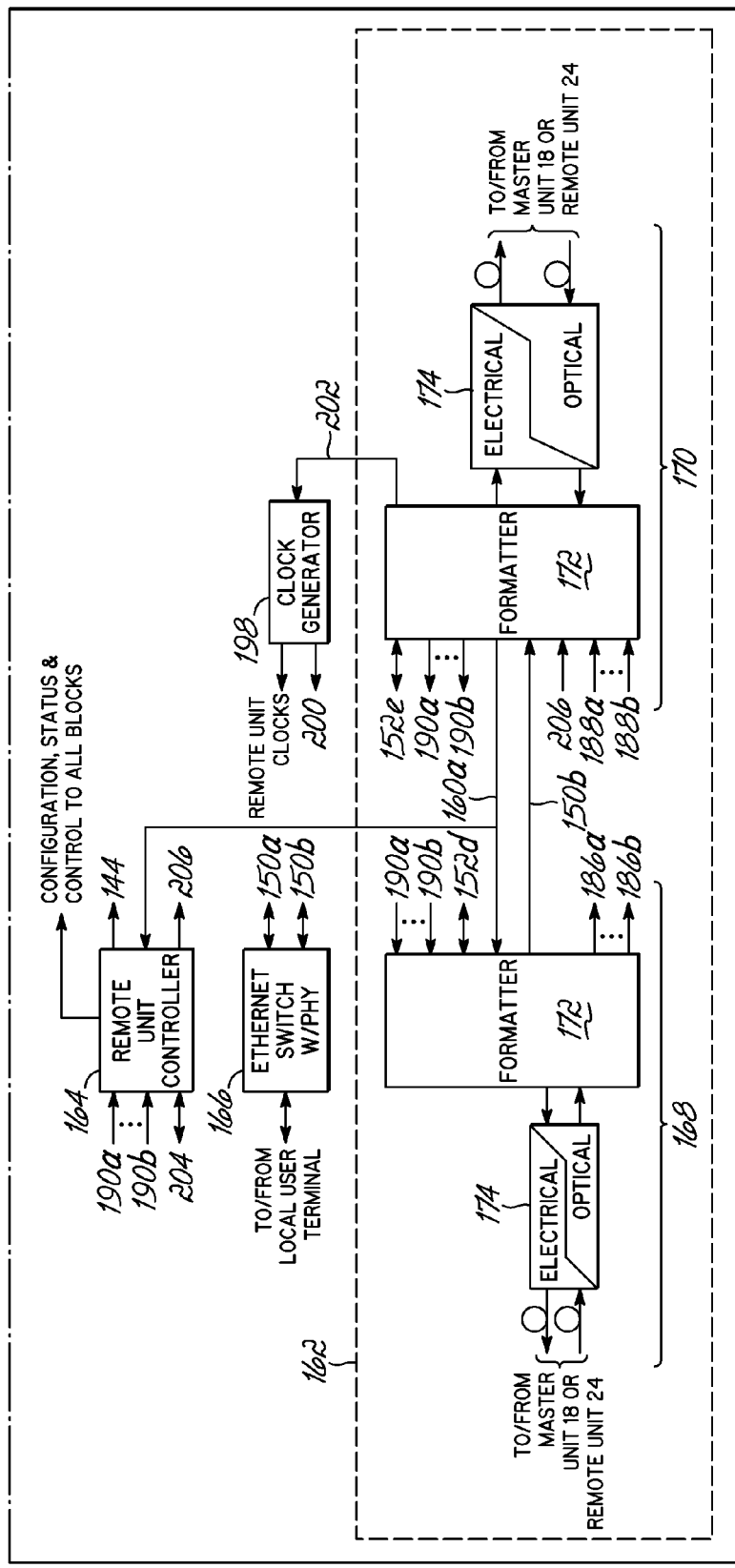
Figure 4:
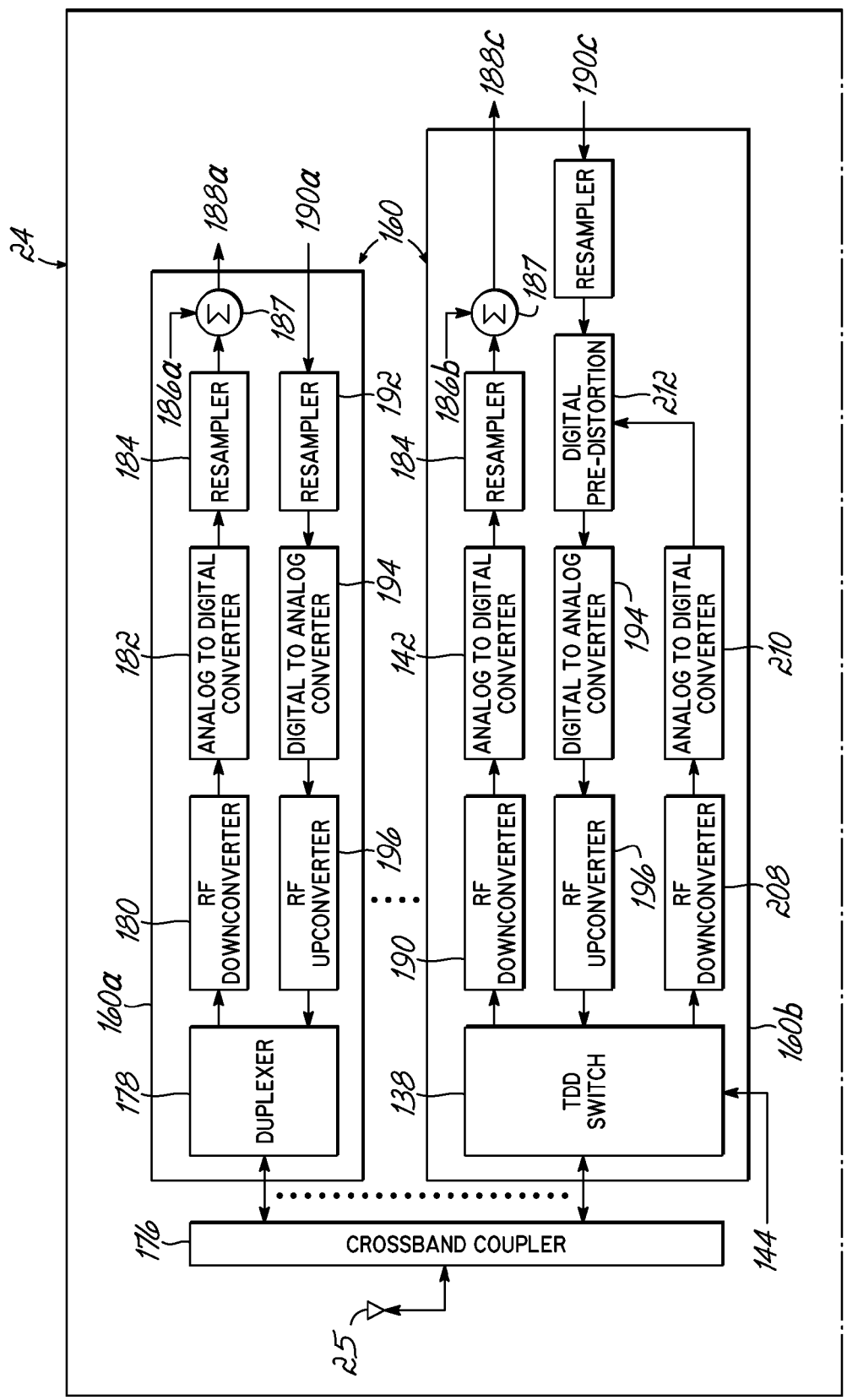
FIG. 4 is a detailed block diagram of an alternate portion of a remote unit utilized in embodiments of the invention.

FIGS. 2-4 illustrate components of an exemplary distributed antenna system for implementing embodiments of the invention. Focusing now on a master unit 18, FIG. 2 contains a detailed block diagram of the master unit 18. Each master unit 18 may contain one or more radio channels 110 (typically from one to six radio channels 110, each hereinafter referred to as a "path"), one or more digitally modulated optical channels 112 (typically from one to four digitally modulated optical channels 112), a controller 114, a clock generator 116, and an Ethernet switch 118.

In one embodiment, each path, such as 110*a*, may be configured to handle a signal to and from the MIMO BTS 12, for example. For a FDD air interface, the paths 110*a* employ a combiner and a duplexer 120 to handle the uplink signal and the downlink signal. An RF downconverter 122 may amplify the received signal from the combiner/duplexer 120 to ensure that an A/D converter 124 is fully loaded. The RF downconverter 122 sets a center frequency of a band within the A/D converter pass band. The wideband A/D 124 digitizes the entire downlink band of the air interface to ensure all downlink channels are digitized. A resampler 126 converts the signal to a complex format, digitally downconverts the frequency band in some cases, decimates and filters the signal, and resamples it. This reduces the amount of data associated with a downlink signal, such as 128*a*, that has to be transferred over the optical lines and synchronizes the rate of the digitized data to the optical network bit rate.

The uplink section of the radio channel 110*a* sums 120 the uplink signals, such as signals 129*a-d*, for its assigned band from remote units 24 coupled to the master unit 18 after they are converted to an electrical signal. The summation 130 is resampled, interpolated to change to a different data rate in some cases, and upconverted by the resampler 132 and then converted to an analog form by the D/A converter 134. The RF upconverter 136 translates the center frequency of the analog signal to the appropriate frequency for the air interface and amplifies it. The amplified signal is applied to the combiner/duplexer 120 and is routed back to the MIMO BTS 12.

In embodiments utilizing TDD air interfaces, the combiner and duplexer are replaced by a switching function 138 shown in FIG. 2 for example in radio channel 110*b*. While the master unit 18 is receiving the downlink signal, a RF amplifier in the RF upconverter is disabled and a shunt switch in the switching function 138 may shunt the RF amplifier to ground to further reduce leakage. During intervals when the master unit 18 is sending the uplink signal to the base station 24, the RF amplifier is enabled, the shunt switch is opened and a series switch in the switching function 138 may be opened to protect the RF downconverter from damage due to high power levels. The switch control timing 144 is determined by a master unit controller 114 from the downlink signal 128*b*. Additionally, a formatter 146 may apply a data compression to reduce the redundant digital information included in the serial data stream before it is sent to the transmitter in an electro-optical transceiver 148. The compression may allow for saving bandwidth or for using a less costly transceiver with lower bit rate. The compressed serial data may be converted into an uncompressed data stream after being received on the opposite ends in the optical received of 148 by the receiver side formatter 146.

Each digitally modulated optical channel 112*a-b* is composed of a formatter 146 and an electro-optical transceiver 148. On the outgoing side, the formatter 146 blocks, into time division multiplexed frames, the digitized downlink signal 128*a-b* along with a customer Ethernet in Reduced Media Independent Interface ("RMII") format 150*a-b*, operation and maintenance ("O&M") data 152*a-c* and synchronization information. In other embodiments, other interfaces such as MII, RMII, GMII, SGMII, XGMII, among others may be used in place of the RMII interface. The framed data may be randomized by exclusive or'ing (XOR) it with the output of a linear feedback shift register to remove long strings of logic ones or zeros. Other known coding formats such as 8 bit/10 bit or 64 bit/66 bit coding may also be used, but may result in a decrease in efficiency in the use of the digital serial link. This digital data is then converted to a serial stream which is used to modulate an optical transmitter within the electro-optical transceiver 148. In a single fiber implementation, a wavelength division multiplexer (WDM) 149 may be employed to combine or split the two optical signals.

For incoming signals from the remote units 24, the electro-optical transceiver 148 converts the optical signal to an electrical signal. The formatter 146 phaselocks to the incoming bit stream and generates a bit clock that is phaselocked to the data rate and aligned with the serial data stream. The formatter 146 then converts the serial stream to a parallel digital data stream, de-randomizes it and performs frame synchronization. It then breaks out the digitized uplink signal for each band, buffers each band and routes the bands to the appropriate radio channel 110*a*, 110*b*, if necessary. Finally, the formatter 146 breaks out the buffers and O&M Ethernet data 152*a-c* and the user Ethernet data 150*a-b* and routes them to the controller 114 and the Ethernet switch 118, respectively.

The master unit controller 114 uses locally stored information and information from the O&M Ethernet data to configure and control the other blocks in the master unit 18. It also passes this information to the remote units 24 and reports status of the remote units 24 and the master unit 18 to the system controller 27. When a radio channel, such as 110*b*, is assigned to a TDD air interface, the master unit controller 114 also uses the corresponding downlink signal 128*b* to derive TDD switch control timing 144.

The master unit controller 114 functions to configure individual modules as well as supervise individual modules. As part of the configuration and supervision functions, the master unit controller 114 is operable to determine the uplink/downlink switch timing in TDD systems by decoding the downlink signaling or acquiring it from a different source such as the time variant uplink Received Signal Strength Indication ("RSSI"), or some base station clock signal provided from an external source. The downlink frame clock in TDMA systems may be determined and distributed by decoding the downlink signaling to allow time slot based functions such as uplink or downlink muting, uplink or downlink RSSI measurements within time slots, uplink and downlink traffic analysis, etc. The master unit controller 114 may detect active channels in the RF spectrum to assist in or automatically configure the filter configuration in the resampler 126, 132. Optimal leveling of the individual signals in the resampler may also be determined by measurement of the RSSI of the various signals in the downlink RF band. A remote unit controller may perform similar tasks in the uplink of the remote unit 24.

The clock generator 116 may use a stable temperature compensated voltage controlled crystal ("TCVXO") to generate stable clocks and reference signals 154 for master unit 18 functional blocks. Although, one of ordinary skill in the art will appreciate that other devices or crystals may also be used to generate clocking signals as long as they are capable of producing the stable clocks required by the system.

Focusing now on a remote unit 24, FIG. 3A and FIG. 3B contain a detailed block diagram of a remote unit 24 consistent with embodiments of the invention. Each unit 24 may contain one or more radio channels 160 (typically from one to six radio channels 160), one or more DMOCs 162 (typically one or two DMOCs 162), a remote unit controller 164 and an Ethernet switch 166.

The DMOCs 162 may be designated as the downstream 168 and upstream channels 170. The downstream channel 168 is connected to a remote unit 24 that precedes this remote unit 24 in a daisy chain, if so configured. The upstream channel 170 is connected to a master unit 18 or another remote unit 24. The DMOC 162 functional blocks are similar to those in the master unit 18. Both consist of a formatter 172 and electro-optical transceiver 174. Outgoing data is buffered, formatted into frames, randomized, parallel to serial converted and used to modulate an optical transmitter in the electro-optical transceiver 174. Incoming data is converted from an optical to electrical format, bit synchronized, de-randomized, frame synchronized and converted to a parallel format. The various data types are then broken out buffered and distributed to other function blocks within the remote unit 24. In some embodiments, formatter 172 may implement compression and decompression schemes to reduce bandwidth over the digital optical link.

Radio channels in the remote unit 24 are functionally similar to those in the master unit 18. Each radio channel is configured to handle a single RF band. Unlike the master unit 18 radio channels 110, the remote unit 24 radio channels 160 are connected via a cross band coupler 176 to its antenna 25. For FDD air interfaces, the radio channels, such as radio channel 160a, employ a duplexer 178 to split the uplink and the downlink signal. Duplexers, cross-band combiners and couplers may be optional for some embodiments of either the master unit 18 or remote units 24. In these embodiments, additional antennas may replace the duplexer 178 and cross-coupler 176 in the remote units 42. Extra cables would be required in the master unit 18. An RF downconverter 180 amplifies the received uplink signal from the antenna 25 to ensure an A/D converter 182 is fully loaded and sets the center frequency of the band within the A/D converter pass band. The wideband A/D 182 digitizes the entire uplink band of the air interface to ensure all uplink channels are digitized. A resampler 184 converts the uplink signal to a complex format, digitally downconverts the signal in some cases, decimates and filters the signal, and resamples it with a multi-rate filter bank. This reduces the amount of data that has to be transferred over the optical links and synchronizes the rate of the digitized data to the optical network bit rate. The output of the resampler 184 is added to the uplink signals 186a from the downstream remote units 24 in summer 187. The summed uplink signal 188a for each band is then sent to a formatter 172 in the upstream channel 170 in the DMOC 162.

The downlink signal 190 for each band (190a, 190b) is interpolated and frequency shifted in the resampler 192. The group delay of individual spectral components can be adjusted via filters or delay elements in the resampler 192. The signal is then converted to an analog form by the D/A converter 194. The RF upconverter 196 translates the center frequency of the analog downlink band to the appropriate frequency for the air interface and amplifies it. The amplified signal is then applied to the antenna 25 and transmitted to a wireless device 32.

For TDD air interfaces, the duplexer 178 is replaced by the switching function 138 shown in radio channel 160b and FIG. 3A. While the remote unit 24 is receiving the uplink, the RF power amplifier in the RF upconverter 196 is disabled and a shunt switch in the switching function 138 shunts the RF power amplifier to ground to further reduce leakage. When the remote unit 24 is transmitting the downlink signal, the RF power amplifier is enabled, the shunt switch is opened to permit the downlink signal to reach the antenna 25 and a series switch in the switching function 138 is opened to protect the RF downconverter 180 from damage due to high power levels. As with the master unit 18, the switch control timing 144 is determined by the controller 164 from the downlink signal 190a, 190b.

The clock generator 198 includes a voltage-controlled crystal oscillator ("VCXO") that is phaselocked to the incoming serial data stream bit rate via a narrowband phaselocked loop ("PLL"). The VCXO output is split and is used as the frequency reference 200 for the local oscillators in each radio channel 160a-b, the sampling clocks for the A/D 182 and D/A 194 converters, and a clock for the other blocks in the remote unit 24. One of ordinary skill in the art will realize that the long term frequency accuracy should be good to ensure the local oscillators are on frequency and that the short term jitter levels should also be low to ensure that the jitter does not corrupt the A/D and D/A conversion processes. By phase-locking to the data rate of the optical link, which is derived from the stable TCVCXO in the master unit 18, the remote unit 24 does not require an expensive oven compensated oscillator or a GPS disciplining scheme to maintain long term frequency accuracy, thereby, making the more numerous remote units 24 less expensive. The use of a narrow band PLL and a crystal controlled oscillator may assist in reducing short term jitter for the A/D and D/A converter clocks. Using the recovered, jitter reduced clocks 202 to re-clock the transmit data in the optical links at each remote unit 24 reduces jitter accumulation which may assist in improving A/D and D/A converter clocks in the downstream remote units 24 and may assist in reducing the bit error rate ("BER") of the optical communication channels 162.

The remote unit controller (RUC) 164 uses locally stored information and information from the O&M Ethernet to configure and control the other blocks in the remote unit 24. Downstream RMII 152d and upstream RMII 152e may also be supplied to the formatter 172. In addition, local O&M data 206 may be configured at a local O&M terminal 204. Remote unit 24 also passes this information to the up and downstream remote units 24 and/or master unit 18. The RUC 164 additionally uses the appropriate downlink signal to derive TDD switch control timing 144 when required.

In an alternate embodiment of the radio channel 160c utilized in a remote unit 24, the radio channel 160c may also employ digital pre-distortion to linearize the power amplifier. This embodiment of the radio channel 160c in a remote unit 24 is shown in the block diagram of FIG. 4. In this embodiment, a third signal path may be added to one or more radio channels 160c. The third path couples off the downlink signal after power amplification and digitizes it. The signal from the antenna 25 is received in an RF downconverter 208, which amplifies the received signal to ensure an A/D converter 210 is fully loaded and sets the center frequency of the band within the A/D converter pass band. The wideband A/D 210 digitizes the entire uplink band of the air interface to ensure all uplink channels are digitized. The digitized signal is compared to a delayed version of the downlink signal in the digital pre-distortion unit 212 and the difference is used to adaptively adjust the gain and the phase of the signal prior to D/A conversion to correct for non-linearity in the power amplifier.

In some embodiments, the topology of a system 10 can be adjusted to optimize MIMO channel capacity. For example, Eq. 1 illustrates a MIMO channel capacity formula for an N×M MIMO system with equal power allocation to each antenna 25:

$$\text{MIMO Channel Capacity Formula} \qquad \text{Equation 1}$$

$$C = \log_2 \det\left(I_{=N} + \frac{\rho}{M} \overline{\overline{H}}\, \overline{\overline{H}}^H\right) = \sum_{k=1}^{R} \log_2\left(1 + \frac{\rho}{M} \lambda_k\right).$$

Thus, the MIMO channel capacity depends on several parameters that have to be taken into account for its optimization. First, the number of N receiving and M transmitting antennas involved. Second, p represents the signal-to-noise and interference ration (SNIR) averaged over the receiving antennas. Finally the H MIMO channel matrix includes the different $H_{ij}$ channel transfer functions between the "i" receiving and "j" transmitting antennas. Furthermore, the MIMO channel matrix is normalized so that the path-loss effect on its coefficients is removed and included into the SNIR parameter. As a result, the MIMO channel matrix is only affected by the level of correlation experienced at the antennas. Moreover the MIMO capacity formula can also be written in terms of the Eigen-values $\lambda_k$ of the MIMO channel matrix, with k ranging from 1 to the MIMO channel matrix rank R.

In some embodiments, the Eigen-values represent an indicator of the correlation affecting the MIMO channel. As such, they provide a measure of the MIMO channel's ability to support multiple spatial streams in order to increase the resulting capacity. Moreover, the channel condition number (CCN), which is the ratio between the smallest Eigen-value and largest Eigen-value, can be exploited as an additional parameter to measure how conditioned the MIMO channel matrix is. In other words, for well-conditioned channel matrices, the CCN approaches the 0 dB value, which means the Eigen-values are all equal and spatial multiplexing can be successfully exploited by virtue of low correlation (e.g., the system can utilize SU-MIMO modes of operation). On the other hand, for ill-conditioned matrices the CCN can jump to 20 dB or even more, which means the channel is highly correlated and it is not able to support spatial multiplexing (e.g., the system cannot utilize SU-MIMO modes of operation).

Figure 5:
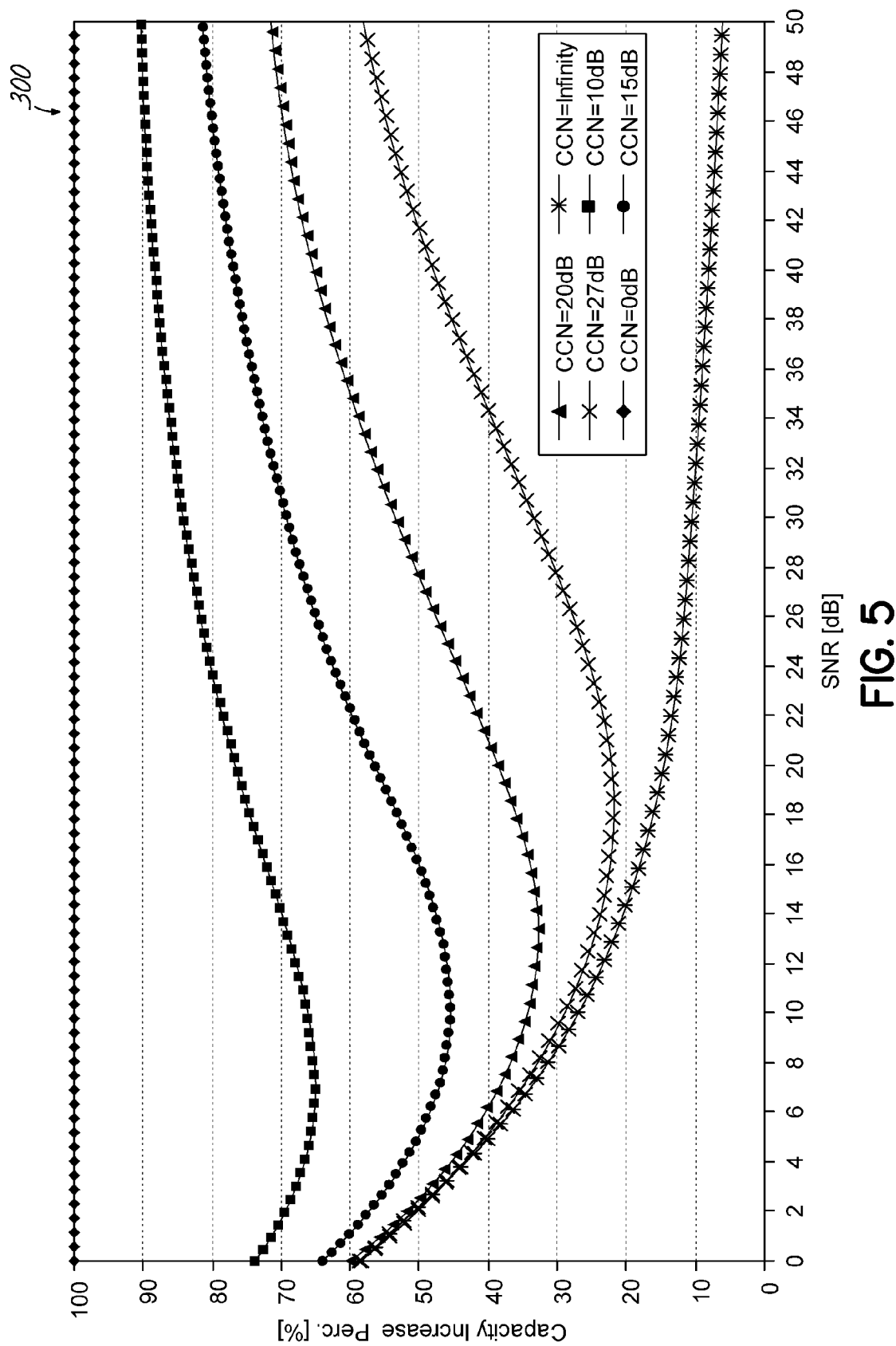
FIG. 5 is a data plot illustrating the channel capacity increase as a function of SNIR, and that further illustrates that, for a given environment, the optimization of MIMO channel capacity depends upon the optimization of the SNIR and the CCN consistent with embodiments of the invention.
Figure 6:
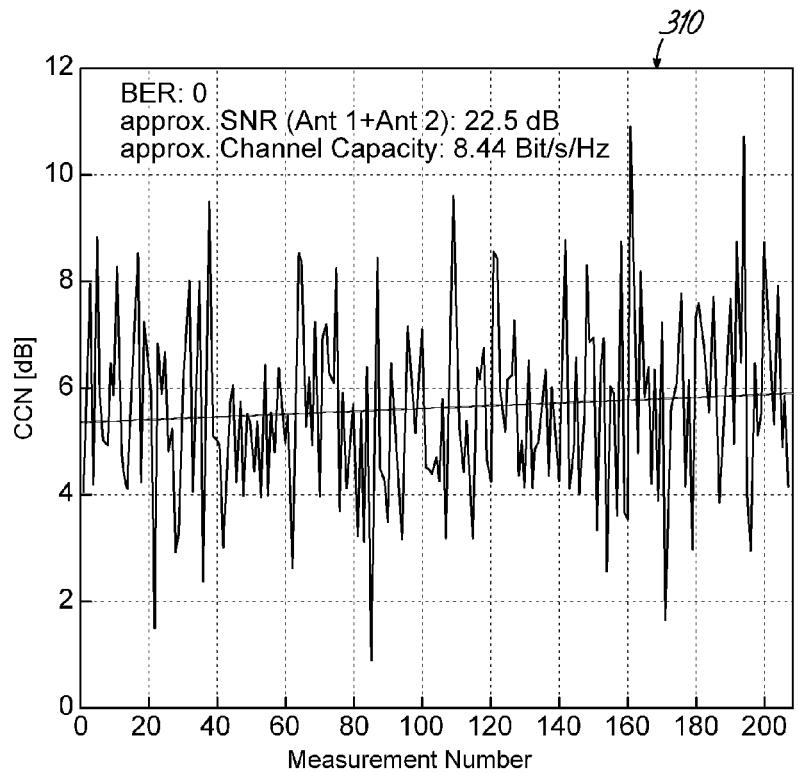
FIG. 6 is a data plot illustrating the typical CCN distribution in a "dense" indoor environment with co-polarized antennas consistent with embodiments of the invention.
Figure 7:
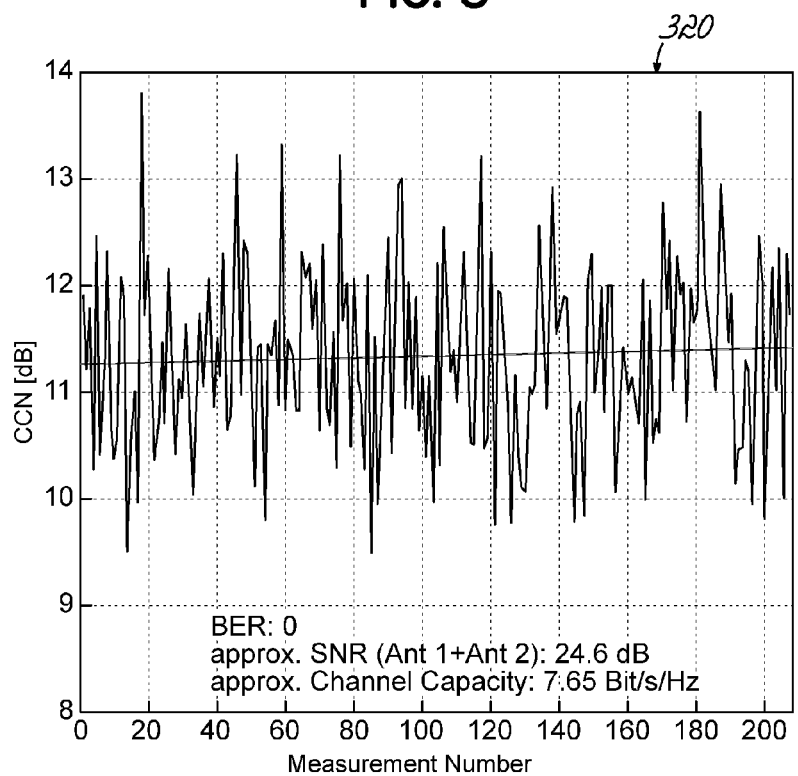
FIG. 7 is a data plot illustrating the typical CCN distribution in an "open" indoor environment with co-polarized antennas consistent with embodiments of the invention.
Figure 8:
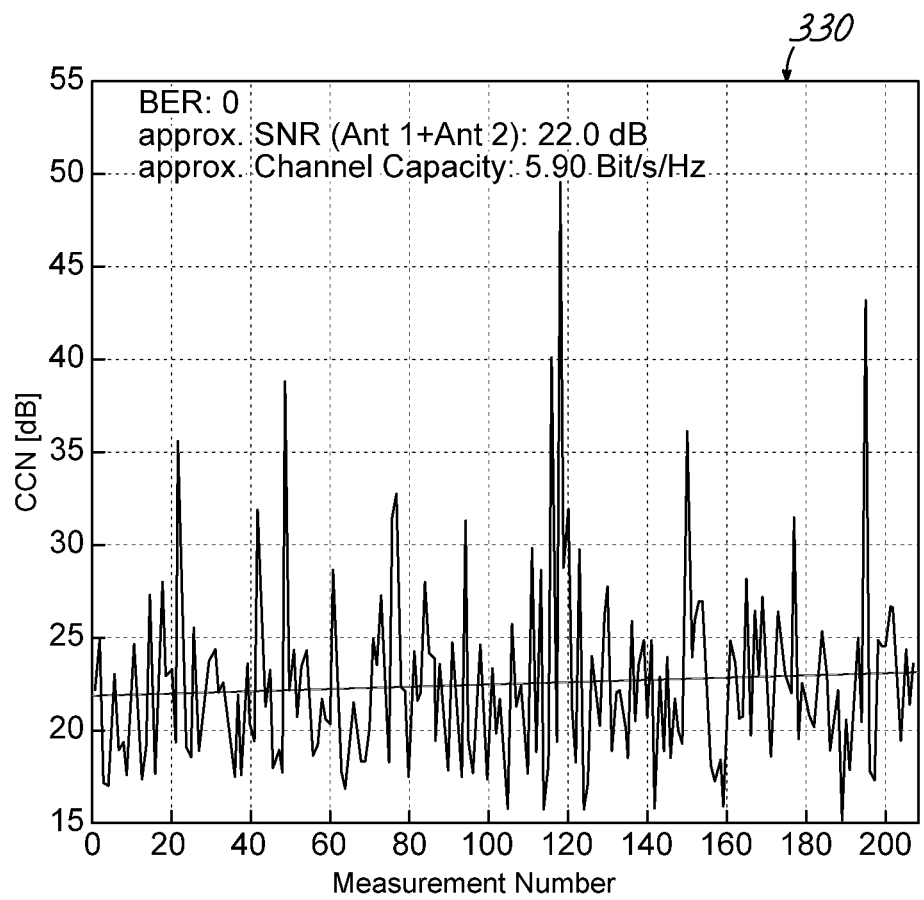
FIG. 8 is a data plot illustrating the typical CCN distribution in a "large" indoor environment with co-polarized antennas consistent with embodiments of the invention.

For example, FIG. 5 is a graph 300 illustrating the channel capacity percentage increase as a function of the SNIR, and that further illustrates, for a given environment, that the optimization of MIMO channel capacity depends upon the optimization of the SNIR and the CCN. Specifically, the graph 300 was generated with a 2×2 MIMO system deployed in an indoor environment, such as illustrated in FIG. 1. The CCN provides an indication on the correlation level affecting the MIMO channel and depends upon several factors, including the scattering properties of the specific environment involved (e.g., rich or poor), the MIMO Tx antenna array spacing (e.g., ranging from λ/2 up), the antenna polarization, the Tx and Rx position (e.g., Line of Sight [LoS] positioning, Not Line of Sight [NLoS] positioning), as well as other factors. For example, three general indoor environments include dense environments (e.g., filled with objects), open environment (e.g., generally devoid of objects), and large environments (e.g., associated with large distances between antennas). FIG. 6 is an illustration of a graph 310 that shows the typical CCN distribution in a "dense" indoor environment with co-polarized antennas, FIG. 7 is an illustration of a graph 320 that shows the typical CCN distribution in an "open" indoor environment with co-polarized antennas, and FIG. 8 is an illustration of a graph 330 that shows the typical CCN distribution in a "large" indoor environment with co-polarized antennas.

Thus, embodiments of the invention are utilized to keep the channel correlation and resulting CCN low by selectively placing antennas (e.g., remote units) in an environment based on the imbalance of received power and SNIR associated with those antennas. Specifically, the antennas are placed in an environment such that wireless devices can receive power contributions from at least two antennas throughout the environment. More specifically, embodiments of the invention specify the power imbalance as well as the SNIR required to have a particular capacity within that area. Thus, wireless devices receive substantial power contributions from several antennas deployed throughout the environment. In ideal embodiments, the antenna deployment provides wireless devices with LoS channel conditions from each antenna throughout the environment such that both low spatial correlation and high SNIR conditions are achieved. However, this solution is often associated with high costs due to the large number of antennas that may be necessary.

Figure 9:
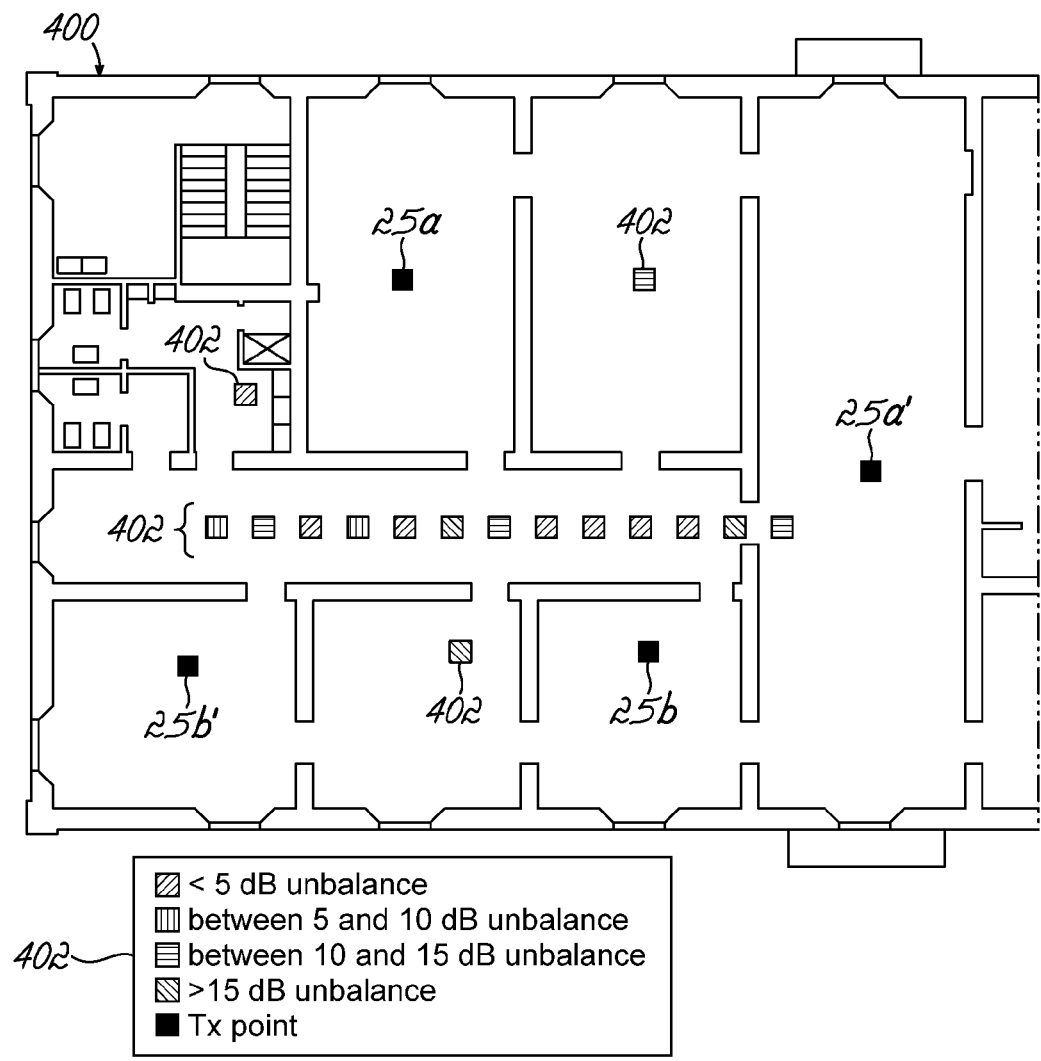
FIG. 9 is an illustration of an indoor environment in which four remote units have been distributed and in which various imbalances between two signals of a 2×2 MIMO scheme have been determined consistent with embodiments of the invention.

FIG. 9 is an illustration of an indoor environment 400 in which four antennas 25a, 25a', 25b and 25b' have been distributed, and in which various imbalances between two signals of a 2×2 MIMO DAS (e.g., such as the system 10 of FIG. 1) have been measured. For example, the power imbalance of received signals is determined by a wireless device or a mobile test set-up (or equivalent equipment). Specifically, the device or test set-up determines the received power of a first signal, the received power of a second signal, and determines the absolute value of the difference of the received power of those two signals to determine the power imbalance of the received signals. With respect to FIG. 1, like reference numerals are utilized in FIG. 9 where applicable.

Antennas 25a and 25a' are configured to communicate a first MIMO signal, while antennas 25b and 25b' are configured to communicate a second MIMO signal. In some embodiments, each antenna 25a, 25a', 25b and 25b' are connected to a respective remote units 24 (not shown), while in alternative embodiments antennas 25a and 25a' are connected to a first remote unit 24a and antennas 25b and 25b' are connected to a second remote unit 24b. A wireless device or mobile test set-up (or equivalent equipment) (not shown) may then determine the power imbalance between the first and second received signals as shown at the illustrated data points. As illustrated in FIG. 9 by reference measurements 402, the interleaved antennas 25a, 25a', 25b and 25b' provide good coverage uniformity and substantial overlapping between coverage areas. For a measured point 402, the relation between the received power imbalances from the signals from the antennas 25a or 25a' and the antennas 25b or 25b' correspond to a particular CCN.

For example, FIG. 10 is a graph 410 illustrating the effect of an imbalance of the received power of two signals on the CCN when that imbalance is less than about 5 dB, while FIG. 11 is a graph 420 illustrating the effect of an imbalance of the received power of two signals on the CCN when that imbalance is from about 5 dB to about 10 dB. Similarly, FIG. 12 is a graph 430 illustrating the effect of an imbalance of the received power of two signals on the CCN when that imbalance is from about 10 dB to about 15 dB, while FIG. 13 is a graph 440 illustrating the effect of an imbalance of the received power of two signals on the CCN when that imbalance is greater than about 15 dB. Thus, for a low power imbalance (e.g., less than 5 dB) the CCN assumes a low value, while a high power imbalance (e.g., more than 15 dB) is associated with a CCN of 20 dB or more. By adopting a MIMO antenna distribution approach of the invention, the CCN is driven by the power imbalance parameter rather than channel correlation.

Figure 14:
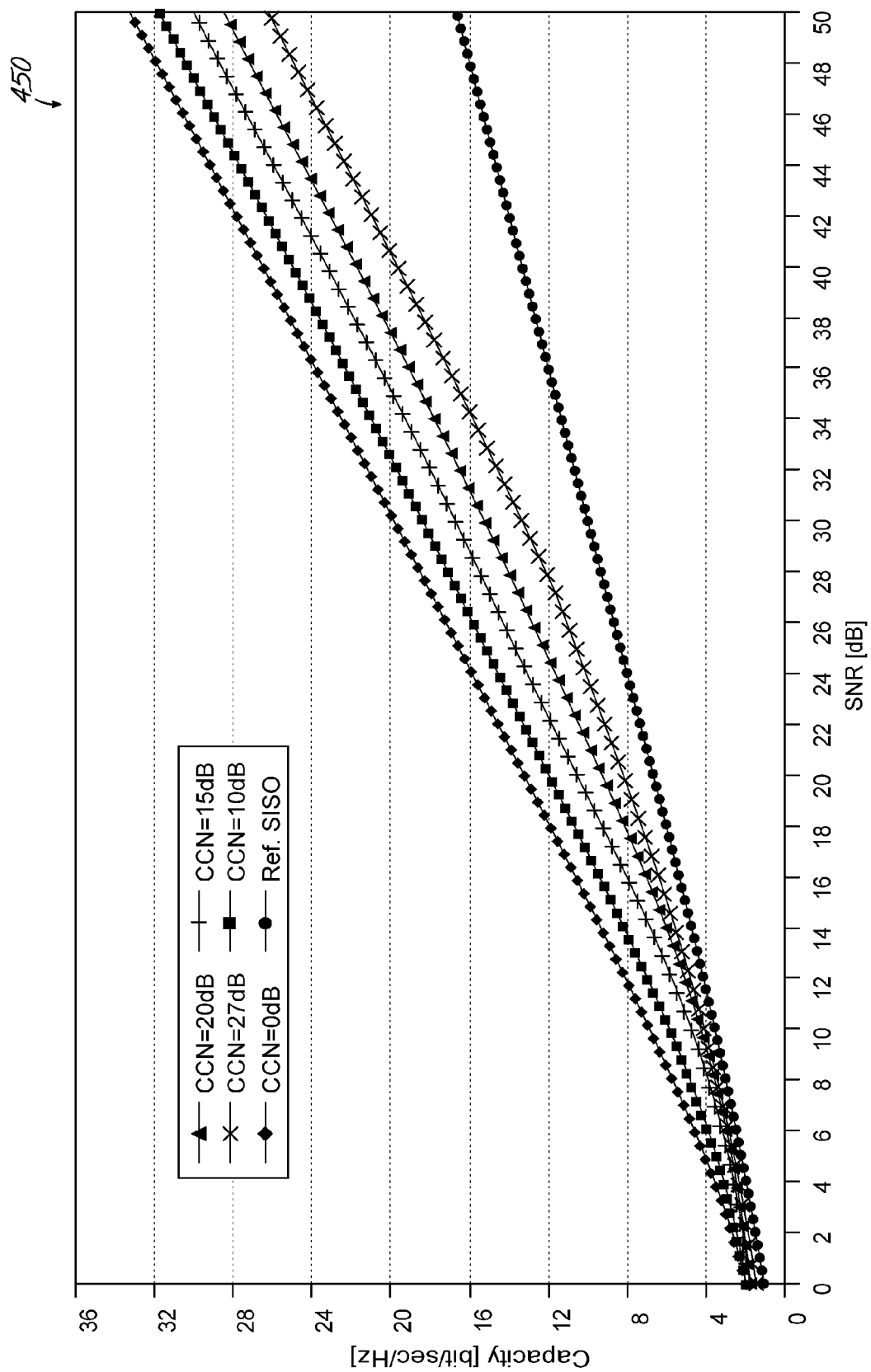
FIG. 14 is a data plot illustrating the effect of the CCN and SNIR on the capacity of a MIMO system consistent with embodiments of the invention.

To determine where to selectively place antennas in accordance with one aspect of the invention, embodiments of the invention determines the imbalance of the received power from two interleaved antennas, as well as the SNIR experienced at that point. A user determines the CCN from that power imbalance, then correlates the CCN and SNIR to a datastore (e.g., a database, graph, or other collection) of information to determine the MIMO capacity of a MIMO system with the antennas at their selected locations. For example, FIG. 14 is datastore in the form of a graph 450 illustrating the effect of the CCN and SNIR with the capacity of a MIMO system with interleaved antennas according to the invention. By determining the CCN and SNIR at a point, a user determines the capacity for a MIMO system at a particular point in the environment, and thus determines whether to place an antenna at that point or to place it at an alternative point in the area.

Figure 15:
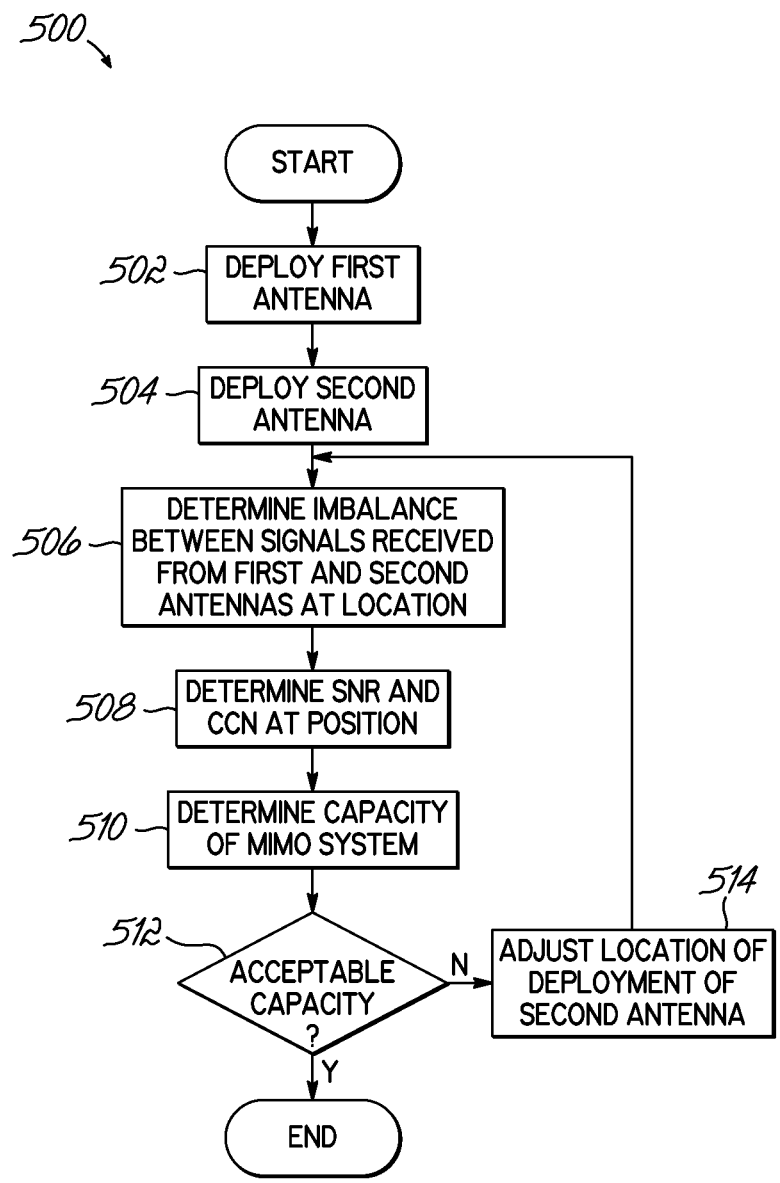
FIG. 15 is a flowchart illustrating a sequence of operations to selectively determine a location to deploy a plurality of remote units, or a plurality of antennas of remote units, to optimize the capacity of a MIMO DAS in an environment consistent with embodiments of the invention.

FIG. 15 is a flowchart 500 illustrating a sequence of operations to selectively determine a location to deploy a plurality of remote units, or a plurality of antennas of remote units, to optimize the capacity of a MIMO DAS in an environment consistent with embodiments of the invention. Initially, a user deploys a first antenna at a first location that may be desirable from a signal coverage standpoint (block 502). Then a user deploys a second antenna at a second location (block 504). An imbalance between the received power of signals from the first antenna and the received power of signals from the second antenna is then determined at a predetermined location (e.g., a "power imbalance") (block 506).

After determining the power imbalance, a CCN and SNIR for the signals at the predetermined location is determined (block 508) and the capacity of the MIMO DAS with the first antenna at the first location and the second antenna at the second location is determined (block 510). Specifically, and as described above, a datastore of the relationship between the CCN and the SNIR may be utilized to determine the capacity of the MIMO DAS. As such, when the capacity is not acceptable (e.g., the capacity of the MIMO DAS is not high enough for a desired installation) ("No" branch of decision block 512), the user adjusts the location of deployment of the second antenna (block 514) and the sequence of operations returns to block 506. However, when the capacity is acceptable (e.g., the capacity of the MIMO DAS is high enough for a desired installation) ("Yes" branch of decision block 512) the sequence of operations ends.

Figure 16:
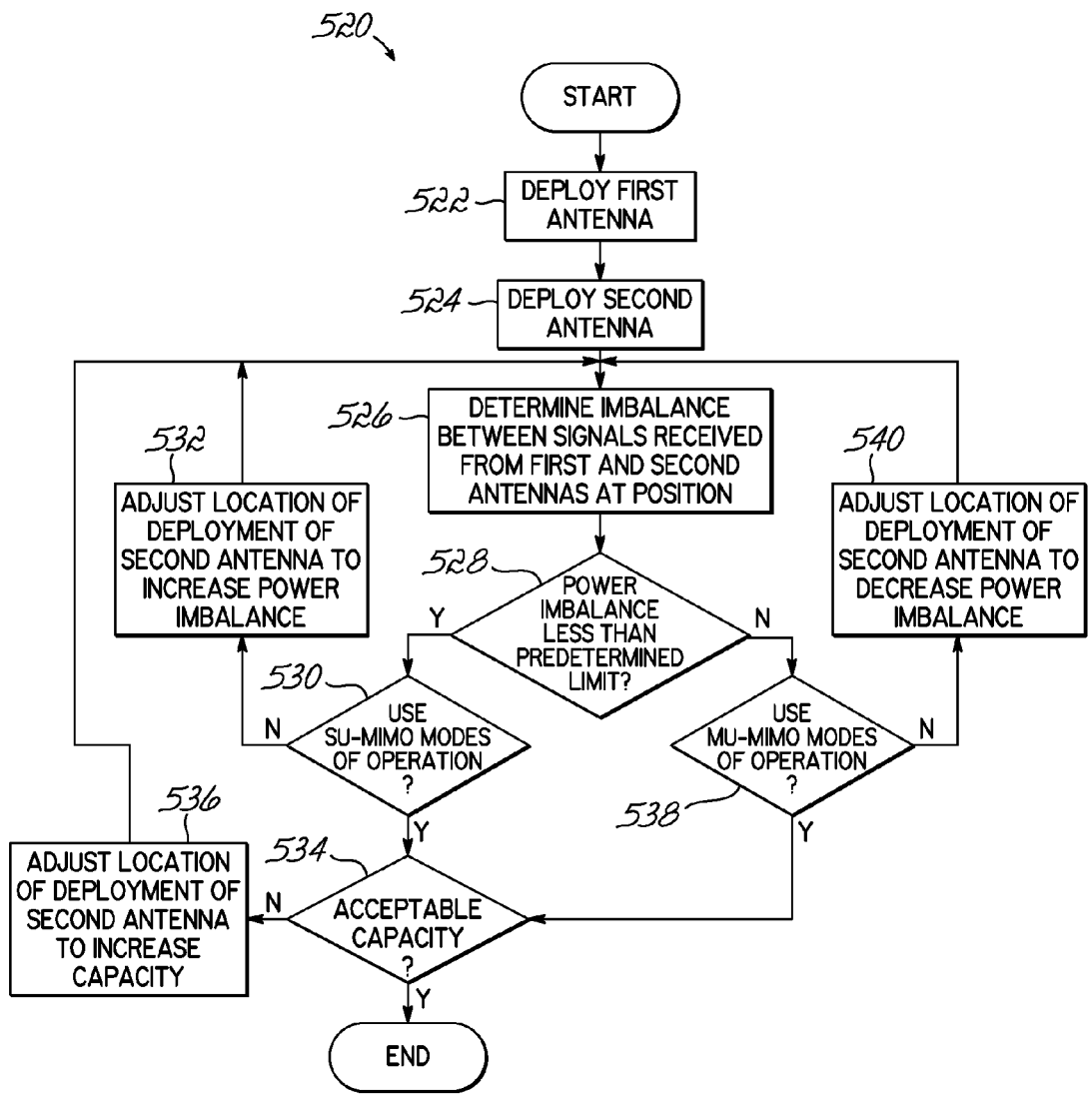
FIG. 16 is a flowchart illustrating a sequence of operations for a user to selectively tune the operation of a MIMO DAS in either a SU-MIMO mode of operation or a MU-MIMO mode of operation based upon a power imbalance consistent with embodiments of the invention.

In alternative embodiments, a determined power imbalance can be utilized to tune a MIMO DAS to more efficiently operate in a SU-MIMO mode of operation or a MU-MIMO mode of operation. FIG. 16 is a flowchart 520 illustrating a sequence of operations for a user to selectively tune the operation of a MIMO DAS in either a SU-MIMO mode of operation or a MU-MIMO mode of operation based upon a power imbalance consistent with embodiments of the invention. Initially, the user deploys a first antenna at a first location (block 522) and deploys a second antenna at a second location (block 524). A power imbalance between signals from the first and second antennas is then determined at a predetermined location (block 526).

The power imbalance between signals from the first and second antennas can be used to tune a MIMO DAS to more efficiently utilize SU-MIMO and MU-MIMO modes of operation. As such, it is determined whether the power imbalance is below a predetermined threshold, such as about 15 dB (block 528). When the power imbalance is below the predetermined threshold ("Yes" branch of decision block 528) it is determined whether the MIMO DAS is configured to utilize SU-MIMO modes of operation (block 530). When the MIMO DAS is not going to be utilized with SU-MIMO modes of operation ("No" branch of decision block 530), the location of the deployment of the second antenna is adjusted to increase the power imbalance (block 532) and the sequence of operations returns to block 526.

When the MIMO DAS is configured to utilize SU-MIMO modes of operation ("Yes" branch of decision block 530), it is determined whether the capacity for the MIMO DAS is acceptable (block 534). When the capacity is not acceptable ("No" branch of decision block 534) the location of the deployment of the second antenna is adjusted to increase the capacity of the MIMO DAS (block 536). However, when the capacity is acceptable ("Yes" branch of decision block 534) the sequence of operations ends.

Returning to block 528, when the imbalance is not less than the predetermined limit ("No" branch of decision block 528), it is determined whether the MIMO DAS is configured to utilize MU-MIMO modes of operation (block 538). When the MIMO DAS is not configured to utilize MU-MIMO modes of operation ("No" branch of decision block 538) the location of the deployment of the second antenna is adjusted to decrease the power imbalance (block 540). However, when the MIMO DAS is configured to utilize MU-MIMO modes of operation ("Yes" branch of decision block 538), it is again determined whether the capacity for the MIMO DAS is acceptable (block 534). When the capacity is not acceptable ("No" branch of decision block 534) the location of the deployment of the second antenna is adjusted to increase the capacity of the MIMO DAS (block 536). However, when the capacity is acceptable ("Yes" branch of decision block 534) the sequence of operations ends.

As discussed above, the CCN corresponds to the RF power imbalance of two signals. Specifically, in a 2×2 MIMO system, the interleaving of antennas using a DAS signal gives an advantage in terms of the capacity, C, when compared to classical MIMO deployments based on coverage with a plurality of antennas as well as co-located antenna arrays. Thus, the position of each remote unit or antenna is the driver for building radio coverage within an environment to exploit the maximum capacity C in accordance with the invention.

In some embodiments, users can employ a ray-tracing simulator, algorithm, or other equivalent simulation to determine the optimized position of each antenna to provide a maximum C within an environment or to optimize the operation of a system for either MU-MIMO or SU-MIMO modes of operation. As such, embodiments of the invention, and particular embodiments of the invention that utilize the sequence of operations illustrated in FIG. 15 and FIG. 16, can be performed by a computing system, or otherwise integrated into program code executed by the computing system. Such a computing system typically includes one or more processors coupled to a memory. The computing system also typically includes at least one network interface coupled to at least one network, as well as at least one input/output device interface coupled to at least one peripheral device, such as a user interface (including, for example, a keyboard, mouse, a microphone, and/or other user interface) and/or at least one output device (including, for example, a display, speakers, a printer, and/or another output device). Such computer systems are often under the control of an operating system and execute, or otherwise rely upon, various computer software applications, sequences of operations, components, programs, files, objects, modules, etc., consistent with embodiments of the invention.

Alternatively, users can take advantage of the RF power imbalance, specifically of a pre-installed SISO system. For example, a first remote unit or antenna may be placed inside an environment according to well know radio coverage design rules (e.g., for example, in an already installed SISO system).

To exploit capacity and capabilities of a MIMO system, a second remote unit may be placed in a different position to achieve, from the two different paths and for the whole in-building area or other environment under consideration, an RF power imbalance below to a given limit, such as about 15 dB, for example. More specifically, the proper placement of the second remote unit can be determined at least three different ways: (1) exploiting SISO radio coverage design rules with the goal to maximize the area of the environment where the RF power imbalance is below a predetermined limit (for example, using a SISO radio coverage SW tool); (2) running different trials in which different locations for the second antenna are attempted and exploiting a wireless device or other mobile test-set (or equivalent equipment) to maximize the coverage area where the RF power imbalance is below the predetermined limit, including finding the location for the second antenna that takes advantage of the scattering or shadowing effect of the environment; or (3) if it is infeasible to try several locations for the second antenna, an approximate location for the second antenna can be used and, from the same wireless device or other mobile test-set (or equivalent equipment), information on the RF power imbalance and SNIR from the first remote unit can be gathered in order to delimit/analyze the coverage area where a particular capacity C for the MIMO system can be guaranteed.

As such, a user may determine a desired layout of antennas and/or remote units throughout the target environment based upon the existing coverage of that environment, the coverage that can be provided by antennas and/or remote units, and cost considerations. In some embodiments, this determination can be made by analyzing known and/or potential coverages, capacities, and costs of purchasing, installing, and maintaining equipment (remote units, cabling therefore, etc.). The user then selects a layout that provides the desired coverage with the desired capacity within a desired budget.

Figure 17:
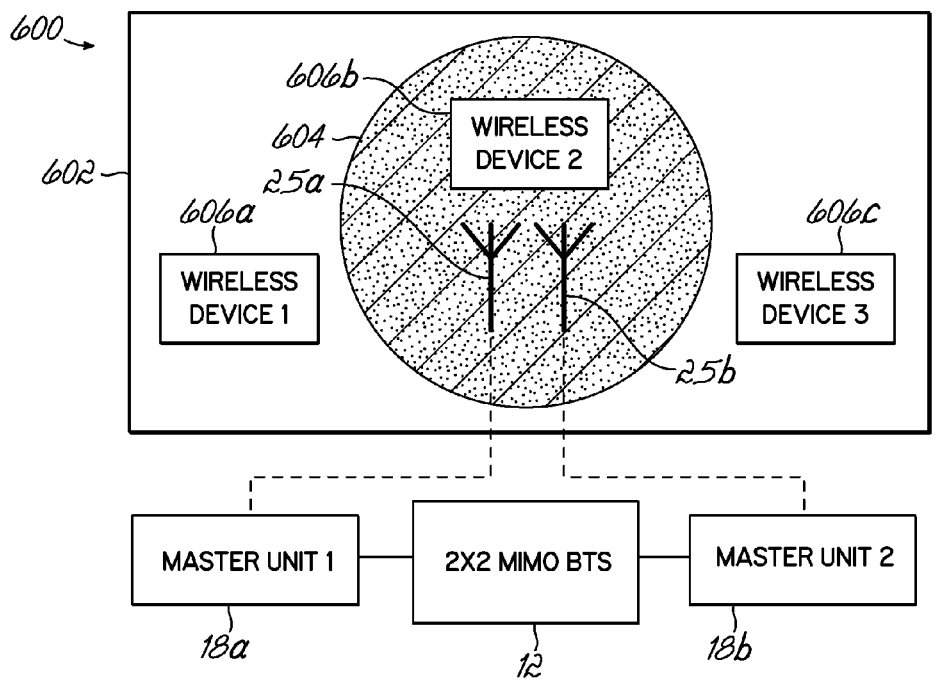
FIG. 17 is a diagrammatic illustration of a MIMO DAS that includes co-located remote antennas within an indoor environment consistent with embodiments of the invention.

By way of example, FIG. 17 is a diagrammatic illustration of a MIMO DAS 600 that includes co-located remote antennas 25a-b within an environment 602. With respect to FIG. 1, like reference numerals are utilized in FIG. 17-19 where applicable. Specifically, the MIMO DAS 600 includes a 2×2 MIMO BTS 12 that provides respective MIMO signals to respective master units 18a-b. The antennas 25a-b can be connected to respective remote units 24a-b (not shown) or connected directly to the master units 18a-b. As illustrated, the MIMO DAS 600 provides a particular coverage area 604 with the antennas 25a-b. For example, the coverage area 604 in the environment 602 may provide signals to only one of three wireless devices 606a-c, with wireless devices 606a and 606c unable to receive signals from either antenna 602a-b (as they are both outside of coverage area 604) and wireless device 606b receiving signals from both antennas 25a-b. As such, the wireless device 606b can utilize SU-MIMO modes of operation, and thus experience a data rate boost, as well as experience transmit diversity against fast fading. However, this particular setup provides the smallest coverage for the environment 602, provides no coverage for wireless devices 606a and 606c, results in a high correlation, and also has a limited sector capacity for either DL or UL MU-MIMO.

Figure 18:
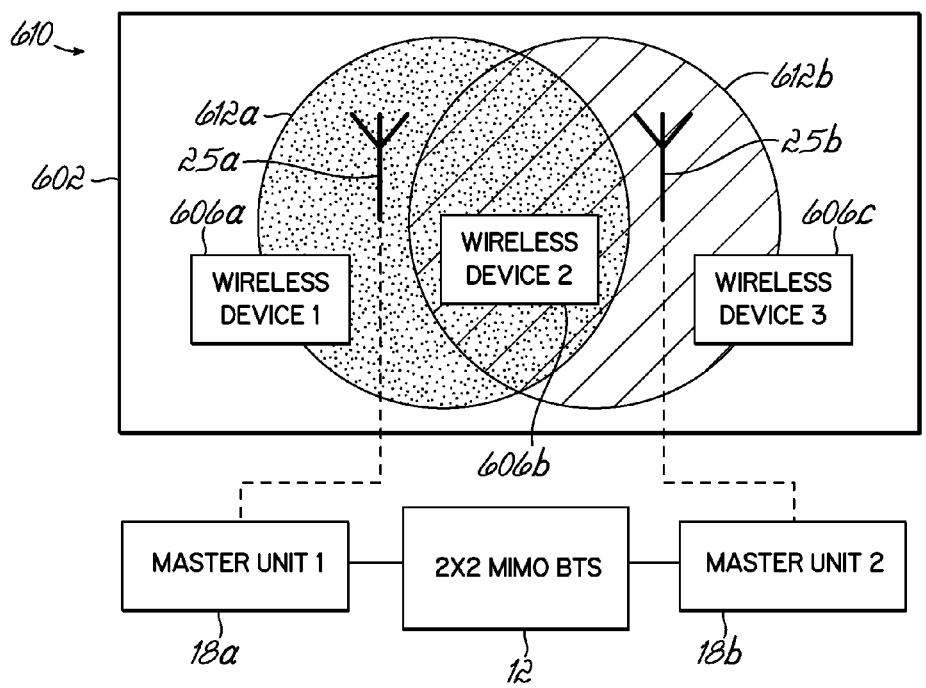
FIG. 18 is a diagrammatic illustration of the MIMO DAS of FIG. 17 in which the remote antennas have been located in different areas of the indoor environment and have overlapping coverage.

FIG. 18, on the other hand, is a diagrammatic illustration of a MIMO DAS 610 in which the remote antennas 25a-b are distributed within the environment 602 but have overlapping coverage areas 612a-b. Specifically, FIG. 18 illustrates that wireless devices 606a and 606b are within the coverage area 612a for the first antenna 25a, while wireless devices 606b and 606c are within the coverage area 612b for the second antenna 25b. Thus, there is low correlation and transmit diversity against slow fading for wireless device 606b, which can utilize SU-MIMO modes of operation. However, there is also SISO coverage for wireless devices 606a and 606c, which can share resources and utilize MU-MIMO modes of operation. Thus, FIG. 18 illustrates that a high sector capacity for MU-MIMO is achieved by distributing the antennas 25a-b. However, this configuration results in a limited data rate boost for wireless device 606b and does not provide transmit diversity against fast fading.

Figure 19:
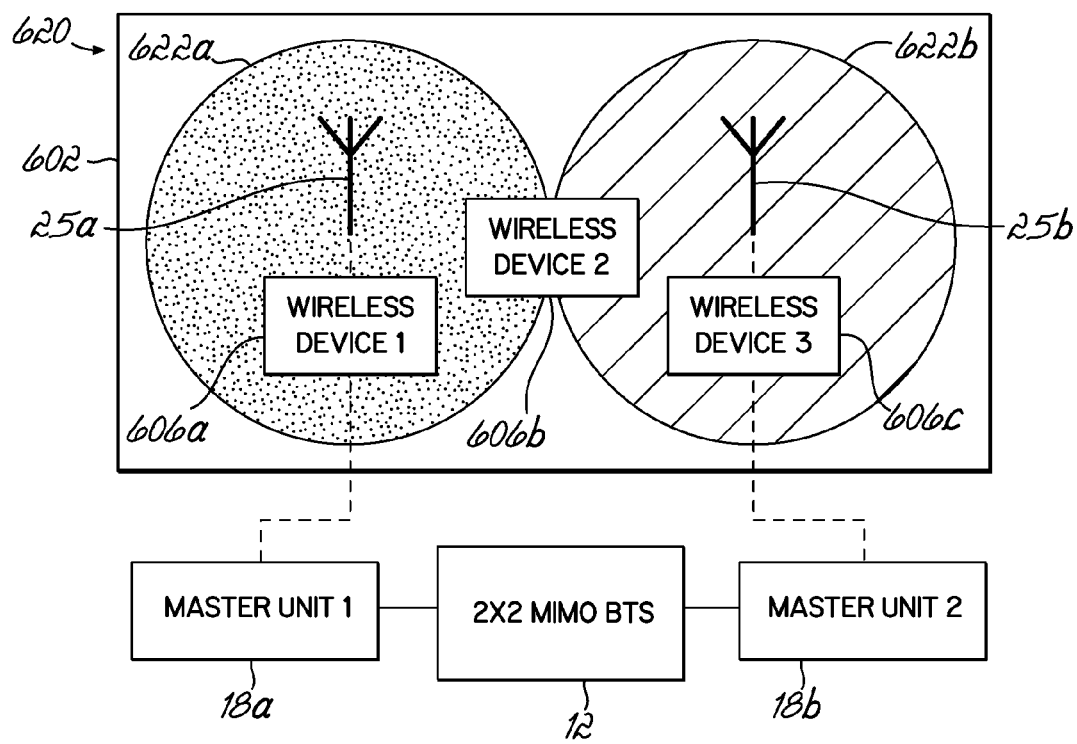
FIG. 19 is a diagrammatic illustration of the MIMO DAS of FIG. 17 in which the remote antennas have been located in different areas of the indoor environment and do not have overlapping coverage.

FIG. 19 is a diagrammatic illustration of a MIMO DAS 620 in which the remote antennas 25a-b are distributed within the environment 602 but do not have overlapping coverage areas 622a-b. FIG. 19 illustrates that wireless devices 606a is within coverage area 622a, that wireless device 606b is within either coverage area 622a or 622b (but not both at the same time), and that wireless device 606c is within coverage area 622b. However, the coverage areas 622a and 622b do not overlap. Thus, the largest SISO coverage for the environment 602 is provided. Specifically, there is SISO coverage for each wireless device 606a-c, while wireless devices 606a and 606c can share resources and utilize MU-MIMO modes of operation. The MIMO DAS 620 also has a higher sector capacity for MU-MIMO modes of operation than either the MIMO DAS 600 of FIG. 17 or the MIMO DAS 610 of FIG. 18. However, wireless device 606b does not have a data rate boost and cannot operate in SU-MIMO modes of operation, as it only receives signals from one antenna 252a or 252b. Moreover, there is no transmit diversity for any of the wireless devices 606a-c.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. For example, a distributed antenna system consistent with embodiments of the invention may have more or fewer MIMO BTSs 12, master units 18, remote units 24, and/or system controllers 27 than those illustrated. In particular, each MIMO BTS 12 may include more or fewer antennas 14 and/or 16.

Additionally, each master unit 18 may be connected to more or fewer remote units 24 than those illustrated. As such, a plurality of remote units 24 may be connected to each master unit 18 through two links and/or along a single link as discussed above. Alternatively, each remote unit 24 may be connected to a master unit 18 through a dedicated link. In some embodiments, a plurality of remote units 24 may be connected in series from a master unit 18. As such, remote units 24 may be positioned to optimize coverage within a coverage area consistent with embodiments of the invention. Moreover, one having ordinary skill in the art will appreciate that a master unit 18 may be incorporated with a remote unit 24, and thus operate as an active (or passive) distribution point as is well known in the art. As such, each such master unit 18 may be connected directly to at least one antenna 25. Moreover, one having ordinary skill in the art will appreciate that in the links 22a-b connecting the master units 18 to the remote units 24, a passive (or active) power splitter can be inserted in order to deploy additional remote units. As such, each such master unit 18 input/output port may be coupled with a plurality of remote units 24 consistent with embodiments of the invention.

Furthermore, and in some embodiments, the master unit controller 114 may measure a pilot signal strength of CDMA or Orthogonal Frequency-Division Multiplexing ("OFDM") signals to properly set the level of the downlink signals, as the RSSI can vary at different capacity loading. The pilot signals generally remain constant with a configured ratio between pilot level and a maximum composite for full loading, the required headroom for the signals may be maintained. The master unit controller 114 may also measure and supervise the signal quality of the provided downlink channels. In case of signal degradation, an alarm may be set and the operator can focus on a base station (e.g., the MIMO BTS 12) without having to troubleshoot the entire system 10.

In some embodiments, the master unit controller 114 determines the amount of channels for a narrowband base station standard such as Global System for Mobile communications ("GSM"). Together with the measurement of the Broadcast Control Channel ("BCCH"), which is constant in power, the proper headroom that is required for a multichannel subband may be determined and overdrive or underdrive conditions may be avoided. In other embodiments, the master unit controller 114 monitors the crest factor of a transmitted spectrum in the presence of multiple channels. The crest factor may provide input to the leveling of the transmit power or the power back-off of particular gain stages of the system. The configured headroom is generally higher than the measured crest factor to avoid signal degradation due to clipping or distortion. In addition, a crest factor reduction mechanism may be employed in the resampler in some of the embodiments to reduce the crest factor and make more efficient use of the RF power amplifier in the remote unit 24 or assist in reducing the number of required bits per sample that need to be transmitted over the link.

Some embodiments of the invention provide benefits in regard to the uplink path of a MIMO communication system. Both WiMAX and LTE wireless standards encompass uplink MIMO features. In particular the "Uplink Collaborative MIMO" is implemented in Mobile WiMAX, while "Uplink MU-MIMO" is the term adopted in LTE for indicating the same technique. The peculiarity of this MIMO scheme is to increase the total uplink sector capacity by reusing time/frequency resources allocated to different wireless devices 32, rather than to boost the data rate per single user as for downlink SU-MIMO (Spatial Multiplexing).

The routines executed to implement embodiments of the invention, whether implemented as part of an operating system or a specific application, component, scheduler, program, object, module or sequence of instructions executed by one or more computing systems have been referred to herein as a "sequence of operations," a "program product," or, more simply, "program code." The program code typically comprises one or more instructions that are resident at various times in various memory and storage devices, and that, when read and executed by one or more processors, cause that a system associated with that processor to perform the steps necessary to execute steps, elements, and/or blocks embodying the various aspects of the invention.

While the invention has been described in the context of fully functioning devices, those skilled in the art will appreciate that the various embodiments of the invention are capable of being distributed as a program product in a variety of forms, and that the invention applies equally regardless of the particular type of computer readable signal bearing media used to actually carry out the distribution. Examples of computer readable signal bearing media include but are not limited to physical and tangible recordable type media such as volatile and nonvolatile memory devices, floppy and other removable disks, hard disk drives, optical disks (e.g., CD-ROM's, DVD's, etc.), among others, and transmission type media such as digital and analog communication links.

In addition, various program code that has been described may have been identified based upon the application or software component within which it is implemented in a specific embodiment of the invention. However, it should be appreciated that any particular program nomenclature is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers (e.g., operating systems, libraries, APIs, applications, applets, etc.), it should be appreciated that the invention is not limited to the specific organization and allocation of program functionality described herein.

Thus, the invention in its broader aspects is not limited to the specific details representative apparatus and method, and illustrative examples shown and described. Accordingly, departures may be made from such details without departure from the spirit or scope of the applicants' general inventive concept. For example, the system 10 of FIG. 1 may be configured with an extension unit (not shown) disposed between a master unit 18 and its corresponding remote units 24. The extension unit may provide additional links for coupling a master unit 18 to additional remote units 24 and/or the extension unit may extend the range of coupling between a master unit 18 and remote units 24.

Additionally, it will be appreciated that the environments 26, 400, and 602 are merely included to show operation of embodiments of the invention therewith, and that embodiments of the invention may be used with indoor or outdoor environments without departing from the scope of the applicants' general inventive concept. Furthermore, in some embodiments, the indoor environment 26 of FIG. 1 and the indoor environment 400 of FIG. 9 are configured in alternative manners than those illustrated.

Other modifications will be apparent to one of ordinary skill in the art. Therefore, the invention lies in the claims hereinafter appended.

What is claimed is:

1. A method of deploying a distributed antenna system, comprising:
    outputting at least a first MIMO signal and a second MIMO signal from a multiple-input and multiple-output (MIMO) base station;
    coupling one or more master units to the MIMO base station for receiving the first and second MIMO signals;
    coupling a first remote unit and a second remote unit to the one or more master units so that the first remote unit receives the first MIMO signal and the second remote unit receives the second MIMO signal different from the first MIMO signal received by the first remote unit;
    positioning the first remote unit at a first location within an environment and communicating the first MIMO signal over a first air interface in the environment;
    positioning the second remote unit at a second location within the environment, different from the first location, and communicating the second MIMO signal over a second air interface in the environment;
    the first and second remote units arranged at the first and second locations within the environment and configured to provide overlapping signal coverage of both the first MIMO signal and the second MIMO signal at a third location in the environment;
    analyzing at least an imbalance of received power between the first and second MIMO signals at the third location in order to determine whether a desired capacity for MIMO communications with the system has been achieved at the third location;
    positioning the first and second remote units within the environment for achieving a desirable received power imbalance associated with the desired capacity for MIMO communications.

2. The method of claim 1 further comprising coupling first and second master units to the MIMO base station, the first and second master units configured to receive the first and second MIMO signals, respectively, and coupling the first remote unit to the first master unit and coupling the second remote unit to the second master unit.

3. The method of claim 1, further comprising:
    determining, at the third location, a signal-to-noise and interference ratio associated with at least one of the first or second MIMO signals.

4. The method of claim 3 further comprising:
determining, from the imbalance, a channel condition number associated with the system.

5. The method of claim 4, further comprising:
determining, from the signal-to-noise and interference ratio and the channel condition number, a capacity for the system.

6. The method of claim 5, further comprising:
determining that the capacity for the distributed antenna system does not meet a predetermined capacity threshold; and
adjusting the location of deployment of at least one of the air interfaces.

7. The method of claim 1, further comprising:
determining whether the imbalance is less than a predetermined threshold.

8. The method of claim 7, further comprising:
in response to determining that the imbalance is less than the predetermined threshold, determining whether to increase the imbalance.

9. The method of claim 7, further comprising:
in response to determining that the imbalance is less than the predetermined threshold, determining that the capacity for the system does not meet a predetermined capacity threshold; and
adjusting the location of deployment of at least one of the air interfaces.

10. The method of claim 7, further comprising:
in response to determining that the imbalance is greater than the predetermined threshold, determining whether to decrease the imbalance.

11. The method of claim 7, wherein the predetermined threshold is about 15 dB.

12. The method of claim 1, wherein the first and second remote units are arranged in the first and second locations and configured so that the first and second air interfaces are interleaved within the environment to provide interleaved distribution of the first and second MIMO signals.

13. A distributed antenna system comprising:
at least one master unit, the master unit configured for coupling with a multiple-input and multiple-output (MIMO) base station to receive first and second MIMO signals from the MIMO base station;
a plurality of remote units coupled with the master unit, the remote units configured to receive the first and second MIMO signals through the master unit;
a first set of remote units receiving the first MIMO signal and configured for being positioned at various locations within an environment, the remote units of the first set configured for communicating the first MIMO signal over air interfaces in the environment;
a second set of remote units receiving the second MIMO signal different from the first MIMO signal received by the first remote units, the second set of remote units configured for being positioned at various locations within the ah environment different from the locations of the remote units of the first set, the remote units of the second set configured for communicating the second MIMO signal over air interfaces in the environment;
the first and second sets of remote units arranged within the environment and configured to provide overlapping signal coverage of both the first MIMO signal and the second MIMO signal at a plurality of third locations in the environment;
the first and second remote units being analyzed with respect to an imbalance of received power between the first and second MIMO signals at the third locations in order to determine whether a desired capacity for MIMO communications with the system has been achieved at the third locations; and
the first and second remote units being positioned within the environment for achieving a desirable received power imbalance associated with the desired capacity for MIMO communications.

14. The distributed antenna system of claim 13 further comprising a wireless device configured for analyzing at least an imbalance of received power to determine whether a predetermined capacity for MIMO communications with the system has been achieved at the third location.

15. The distributed antenna system of claim 13 wherein the remote units are arranged within the environment and configured to provide signal coverage of both the first MIMO signal and the second MIMO signal to provide, for at least one of the third locations, a desired a signal-to-noise and interference ratio associated with at least one of the first or second MIMO signals.

16. The distributed antenna system of claim 15 wherein the imbalance of received power is associated with a channel condition number associated with the system.

17. The distributed antenna system of claim 16 wherein the system has a capacity based on the signal-to-noise and interference ratio and the channel condition number, and the capacity for the system exceeds a predetermined capacity threshold.

* * * * *